(12) United States Patent
Komma et al.

(10) Patent No.: US 8,206,805 B2
(45) Date of Patent: Jun. 26, 2012

(54) OPTICAL RECORDING MEDIUM, AND METHOD FOR PRODUCING OPTICAL RECORDING MEDIUM

(75) Inventors: Yoshiaki Komma, Osaka (JP); Joji Anzai, Osaka (JP); Hiroyasu Inoue, Nagano (JP); Takashi Kikukawa, Nagano (JP); Koji Mishima, Nagano (JP); Jun Nakano, Tokyo (JP); Manami Miyawaki, Kanagawa (JP); Shigeki Takagawa, Kanagawa (JP)

(73) Assignees: Panasonic Corporation, Osaka (JP); TDK Corporation, Tokyo (JP); Sony Corporation, Tokyo (JP)

( * ) Notice: Subject to any disclaimer, the term of this patent is extended or adjusted under 35 U.S.C. 154(b) by 383 days.

(21) Appl. No.: 12/580,721

(22) Filed: Oct. 16, 2009

(65) Prior Publication Data

US 2010/0143637 A1   Jun. 10, 2010

Related U.S. Application Data

(60) Provisional application No. 61/106,012, filed on Oct. 16, 2008.

(51) Int. Cl.
*B32B 3/02* (2006.01)
(52) U.S. Cl. .................. 428/64.1; 428/64.4; 430/270.11
(58) Field of Classification Search .................. 428/64.1
See application file for complete search history.

(56) References Cited

U.S. PATENT DOCUMENTS

| | | | |
|---|---|---|---|
| 5,980,985 | A | 11/1999 | Kikuchi |
| 2004/0139459 | A1 | 7/2004 | Mishima et al. |
| 2008/0109837 | A1 | 5/2008 | Anzai et al. |
| 2009/0263613 | A1 | 10/2009 | Habuta et al. |
| 2009/0303864 | A1 | 12/2009 | Nagata et al. |

FOREIGN PATENT DOCUMENTS

| | | |
|---|---|---|
| JP | 10-249264 | 9/1998 |
| JP | 2001-155380 | 6/2001 |
| JP | 2005-285222 | 10/2005 |
| JP | 2008-117513 | 5/2008 |
| WO | 2007/052614 | 5/2007 |
| WO | 2008/015974 | 2/2008 |

OTHER PUBLICATIONS

Tsuyoshi Komaki et al., "Spin-coating technology of the cover layer for the DVR-Blue disc", International Symposium on Optical Memory 2001, Oct. 16-19, 2001, pp. 316-317.

(Continued)

*Primary Examiner* — Elizabeth Mulvaney
(74) *Attorney, Agent, or Firm* — Wenderoth, Lind & Ponack, L.L.P.

(57) ABSTRACT

An object of the invention is to provide an optical recording medium and a method for producing an optical recording medium that enable to improve the quality of a servo signal and a reproduction signal. The optical recording medium satisfies: $t3-t4 \geq 1$ μm, $t4-t2 \geq 1$ μm, $t2 \geq 10$ μm, and $t1-(t2+t3+t4) \geq 1$ μm, where t1 is a thickness between a surface of the optical recording medium, and the first information recording surface, t2 is a thickness between the first optical recording surface and the second information recording surface, t3 is a thickness between the second optical recording surface and the third information recording surface, and t4 is a thickness between the third optical recording surface and the fourth information recording surface.

18 Claims, 13 Drawing Sheets

OTHER PUBLICATIONS

Michel M. J. Decré et al., "Cover Layer Technology for the High-Numerical-Aperture Digital Video Recording System", accepted for publication Oct. 5, 1999, Japan Journal of Applied Physics, vol. 39 (2000), Part 1, No. 2B, Feb. 2000, pp. 775-778.

Isao Ichimura et al., "Proposal for a multilayer read-only-memory optical disk structure", Applied Optics, vol. 45, No. 8, Mar. 10, 2006, pp. 1794-1803.

Koji Mishima et al., "150 GB, 6-layer write once disc for Blu-ray Disc system", Optical Data Storage 2006, Proc. of SPIE, vol. 6282, 628201, 2006, pp. 628201-1-628201-11.

Koji Mishima et al., "150 GB, 6-Layer Write Once Disc for Blu-ray Disc System", 2006 IEEE, pp. 123-125.

Tsuyoshi Komaki et al., "Spin-Coating Technology of the Cover Layer for Digital Video Recording-Blue Disc", accepted for publication Feb. 27, 2002, Japan Journal of Applied Physics, vol. 41 (2002), Part 1, No. 6A, Jun. 2002, pp. 3922-3923.

Koji Mishima et al., "150 GB, 6-Layer Write Once Disc for Blu-ray Disc System", Apr. 25, 2006.

International Search Report issued Dec. 1, 2009 in International (PCT) Application No. PCT/JP2009/005317.

Supplementary European Search Report issued Apr. 5, 2012 in Application No. EP 09 82 0423.

Noriyoshi Shida et al., "Multilayer Optical Read-Only-Memory Disk Applicable to Blu-ray Disc Standard Using a Photopolymer Sheet with a Recording Capacity of 100 GB", Japanese Journal of Applied Physics, The Japan Society of Applied Physics, JP, vol. 43, No. 7B, Jul. 29, 2004, pp. 4983-4986.

OPTICAL RECORDING MEDIUM, AND METHOD FOR PRODUCING OPTICAL RECORDING MEDIUM

This application claims the benefit of U.S. Provisional Application No. 61/106,012 filed Oct. 16, 2008.

BACKGROUND OF THE INVENTION

1. Field of the Invention

The present invention relates to an optical recording medium for information recording or reproducing by irradiated light, and a method for producing the optical recording medium, and more particularly to an interlayer structure of an optical recording medium having three or four information recording surfaces.

2. Description of the Background Art

There are known optical discs called as DVD or BD (Blu-ray disc), as examples of the commercially available high-density and large-capacity optical information recording media. In recent years, the optical discs have become widely used as recording media for recording images, music, and computer-readable data. There has also been proposed an optical disc having plural recording layers, as disclosed in JP 2001-155380A, to further increase the recording capacity.

FIG. 13 is a diagram showing an arrangement of a conventional optical recording medium and optical pickup. An optical recording medium 401 includes a first information recording surface 401a closest to a surface 401z of the optical recording medium 401, a second information recording surface 401b second closest to the surface 401z of the optical recording medium 401, a third information recording surface 401c third closest to the surface 401z of the optical recording medium 401, and a fourth information recording surface 401d farthest from the surface 401z of the optical recording medium 401.

A divergent beam 70 emitted from a light source 1 is transmitted through a collimator lens 53 having a focal length f1 of 15 mm, and incident into a polarized beam splitter 52. The beam 70 incident into the polarized beam splitter 52 is transmitted through the polarized beam splitter 52, transmitted through a quarter wavelength plate 54, and converted into circularly polarized light. Thereafter, the beam 70 is converted into a convergent beam through an objective lens 56 having a focal length f2 of 2 mm, transmitted through a transparent substrate of the optical recording medium 401, and collected on one of the first information recording surface 401a, the second information recording surface 401b, the third information recording surface 401c, and the fourth information recording surface 401d formed in the interior of the optical recording medium 401.

The objective lens 56 is so designed as to make a spherical aberration zero at an intermediate depth position between the first information recording surface 401a and the fourth information recording surface 401d. A spherical aberration corrector 93 shifts the position of the collimator lens 53 in an optical axis direction. Thereby, spherical aberration resulting from collecting light on the first through the fourth information recording surfaces 401a through 401d is removed.

An aperture 55 restricts the opening of the objective lens 56, and sets the numerical aperture NA of the objective lens 56 to 0.85. The beam 70 reflected on the fourth information recording surface 401d is transmitted through the objective lens 56 and the quarter wavelength plate 54, converted into linearly polarized light along an optical path displaced by 90 degrees with respect to the outward path, and reflected on the polarized beam splitter 52. The beam 70 reflected on the polarized beam splitter 52 is transmitted through a light collecting lens 59 having a focal length f3 of 30 mm, converted into convergent light, and incident into a photodetector 320 through a cylindrical lens 57. Astigmatism is imparted to the beam 70 while the beam 70 is transmitted through the cylindrical lens 57.

The photodetector 320 has unillustrated four light receiving sections. Each of the light receiving sections outputs a current signal depending on a received light amount. A focus error (hereinafter, called as FE) signal by an astigmatism method, a tracking error (hereinafter, called as TE) signal by a push-pull method, and an information (hereinafter called as RF) signal recorded in the optical recording medium 401 are generated, based on the current signals. The FE signal and the TE signal are amplified to an intended level, and supplied to actuators 91 and 92 after phase compensation, whereby focus control and tracking control are performed.

In this example, the following problem occurs, in the case where the thickness t1 between the surface 401z of the optical recording medium 401 and the first information recording surface 401a, the thickness t2 between the first information recording surface 401a and the second information recording surface 401b, the thickness t3 between the second information recording surface 401b and the third information recording surface 401c, and the thickness t4 between the third information recording surface 401c and the fourth information recording surface 401d are equal to each other.

For instance, in the case where the beam 70 is collected on the fourth information recording surface 401d to record or reproduce information on or from the fourth information recording surface 401d, a part of the beam 70 is reflected on the third information recording surface 401c. The distance from the third information recording surface 401c to the fourth information recording surface 401d, and the distance from the third information recording surface 401c to the second information recording surface 401b are equal to each other. Accordingly, the part of the beam 70 reflected on the third information recording surface 401c forms an image on a backside of the second information recording surface 401b, and reflection light from the backside of the second information surface 401b is reflected on the third information recording surface 401c. As a result, the light reflected on the third information recording surface 401c, the backside of the second information recording surface 401b, and the third information recording surface 401c may be mixed with reflection light from the fourth information recording surface 401d to be read.

Further, the distance from the second information recording surface 401b to the fourth information recording surface 401d, and the distance from the second information recording surface 401b to the surface 401z of the optical recording medium 401 are equal to each other. Accordingly, a part of the beam 70 reflected on the second information recording surface 401b forms an image on the backside of the surface 401z of the optical recording medium 401, and reflection light from the backside of the surface 401z is reflected on the second information recording surface 40 lb. As a result, the light reflected on the second information recording surface 401b, the backside of the surface 401z, and the second information recording surface 401b may be mixed with reflection light from the fourth information recording surface 401d to be read.

As described above, there is a problem that reflection light from the fourth information recording surface 401d to be read is superimposed and mixed with reflection light which forms an image on the backside of the other layer, with the result that information recording/reproducing is obstructed. The aforementioned mixed light has a high coherence, and forms a brightness/darkness distribution on a light receiving surface by coherence. Since the brightness/darkness distribution is varied depending on a change in phase difference with respect to reflection light from the other layer, resulting from a small thickness variation of an intermediate layer in an in-plane direction of an optical disc, the quality of a servo signal and a reproduction signal may be considerably lowered. Hereinafter, the above problem is called as a back focus problem in the specification.

In order to prevent the above problem, JP 2001-155380A discloses a method, wherein the interlayer distance between the information recording surfaces is gradually increased in the order from the surface 401z of the optical recording medium 401 so that a part of the beam 70 may not form an image on the backside of the second information recording surface 401b and the backside of the surface 401z simultaneously when the beam 70 is collected on the fourth information recording surface 401d to be read. The thicknesses t1 through t4 each has a production variation of ±10 µm. It is necessary to set the thicknesses t1 through t4 to different values from each other, even in the case where the thicknesses t1 through t4 are varied. In view of this, a difference in the thicknesses t1 through t4 is set to e.g. 20 µm. In this example, the thicknesses t1 through t4 are respectively set to 40 µm, 60 µm, 80 µm, and 100 µm, and the total interlayer thickness "t" (=t2+t3+t4) from the first information recording surface 401a to the fourth information recording layer 401d is set to 240 µm.

In the case where the thickness of a cover layer from the surface 401z to the first information recording surface 401a, and the thickness from the fourth information recording surface 401d to the first information recording surface 401a are equal to each other, light reflected on the fourth information recording surface 401d is focused on the surface 401z, and reflected on the surface 401z. The light reflected on the surface 401z is reflected on the fourth information recording surface 401d, and guided to the photodetector 320. A light flux which forms an image on the backside of the surface 401z does not have information relating to pits or marks, unlike a light flux which forms an image on the backside of the other information recording surface. However, in the case where recording layers are laminated into a multilayer, the light amount of a light flux reflected on the backside of the surface 401z is substantially the same as the light amount of a light flux reflected on the backside of the other information recording layer. Accordingly, coherence between a light flux reflected on the backside of the surface 401z, and a light flux reflected on a targeted information recording surface to be recorded or reproduced is generated in the similar manner as in the case of a light flux reflected on the backside of the other information recording surface, which may considerably lower the quality of a servo signal and a reproduction signal.

In view of the above problem, JP 2008-117513A proposes a distance between information recording layers (information recording surfaces) of an optical disc. JP 2008-117513A discloses the following structure.

An optical recording medium has four information recording surfaces, wherein the first through the fourth information recording surfaces are defined in the order from a side closest to a surface of the optical recording medium. The distance from the medium surface to the first information recording surface is set to 47 µm or less. The thicknesses of intermediate layers between the first through the fourth information recording surfaces are combination of a range from 11 to 15 µm, a range from 16 to 21 µm, and a range of 22 µm or more. The distance from the medium surface to the fourth information recording surface is set to 100 µm. The distance from the medium surface to the first information recording surface is set to 47 µm or less, and the distance from the medium surface to the fourth information recording surface is set to 100 µm.

However, in the optimum disc structure in JP 2008-117513A, the distance (=t1) from the medium surface to the first information recording surface is set to 47 µm or less. It is desirable to maximally suppress the amount of degrading an information reproduction signal, in the case where there is a damage or a smear on a surface of an optical disc, by increasing the thickness t1 as much as possible. In a four-layer disc, it is desirable to increase the thickness t1 as much as possible in a condition that the distance from the medium surface to the fourth information recording surface is set to 100 µm as a standard value. There is also a demand for an optimum structure for a three-layer disc having three information recording surfaces.

SUMMARY OF THE INVENTION

In view of the above, an object of the invention is to provide an optical recording medium that enables to improve the quality of a servo signal and a reproduction signal, and a method for producing the optical recording medium.

An optical recording medium according to an aspect of the invention is an optical recording medium having four information recording surfaces. The optical recording medium satisfies: $t3-t4 \geq 1$ µm, $t4-t2 \geq 1$ µm, $t2 \geq 10$ µm, and $t1-(t2+t3+t4) \geq 1$ µm, where $t1$ is a thickness between a surface of the optical recording medium, and the first information recording surface closest to the surface of the optical recording medium, $t2$ is a thickness between the first optical recording surface, and the second information recording surface second closest to the surface of the optical recording medium, $t3$ is a thickness between the second optical recording surface, and the third information recording surface third closest to the surface of the optical recording medium, and $t4$ is a thickness between the third optical recording surface, and the fourth information recording surface farthest from the surface of the optical recording medium.

According to the invention, the optical recording medium having four information recording surfaces satisfies the condition: $t3-t4 \geq 1$ µm, $t4-t2 \geq 1$ µm, $t2 \geq 10$ µm, and $t1-(t2+t3+t4) \geq 1$ µm. The above arrangement enables to prevent image formation on the backside of the surface of the optical recording medium, and reduce coherence between reflection light from the information recording surfaces to thereby improve the quality of a servo signal and a reproduction signal. The above arrangement also enables to set a distance between the surface of the optical recording medium, and the information recording surface closest to the surface of the optical recording medium to a large value to thereby suppress deterioration of a reproduction signal, resulting from a damage or a smear on the surface of the optical recording medium.

DETAILED DESCRIPTION OF THE PREFERRED EMBODIMENTS OF THE INVENTION

In the following, embodiments of the invention are described referring to the accompanying drawings. The following embodiments are merely examples embodying the invention, and do not limit the technical scope of the invention.

(First Embodiment)

In the following, an optical recording medium in accordance with the first embodiment of the invention is described referring to FIGS. 1 and 2.

Figure 1:
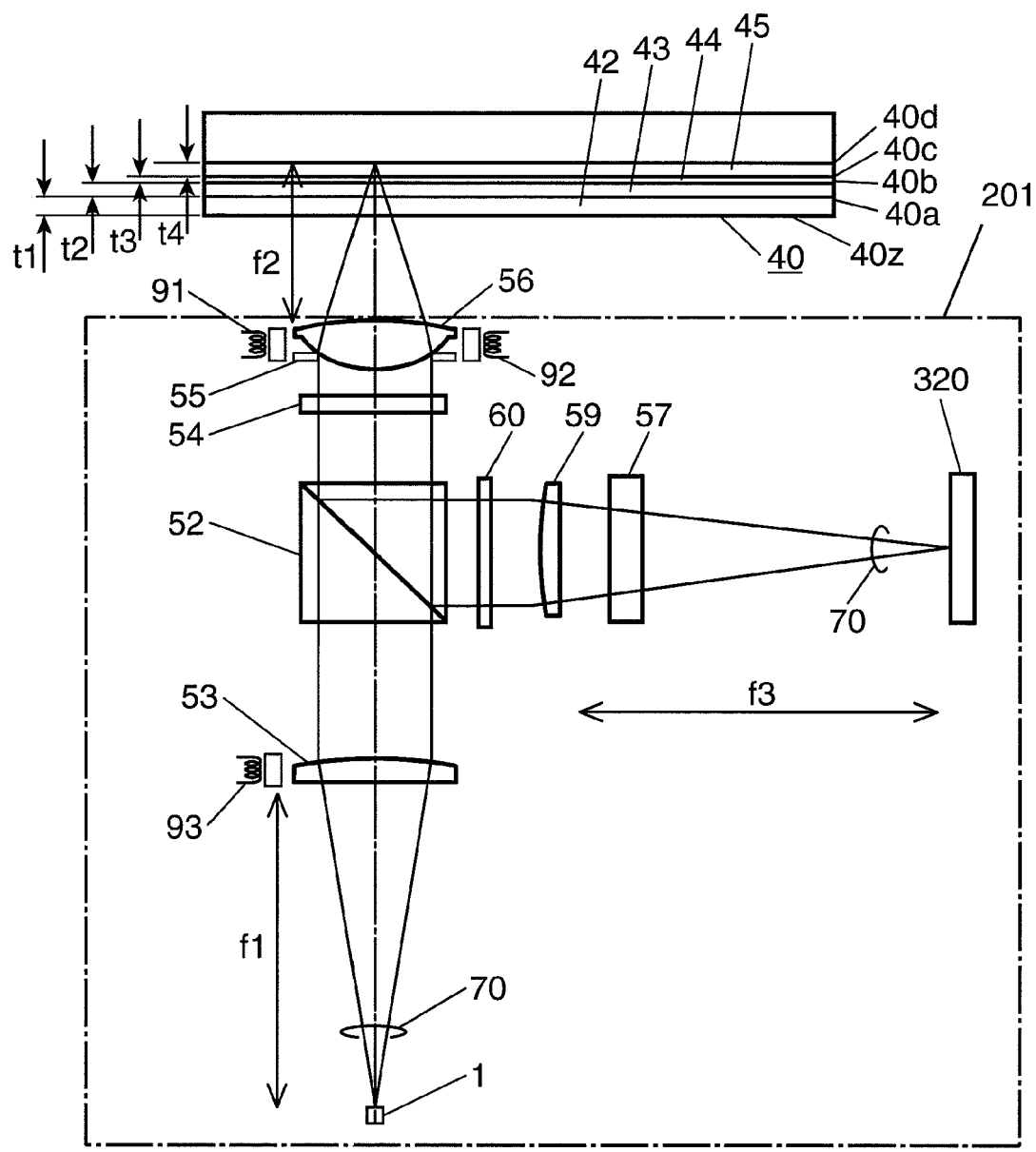
FIG. 1 is a diagram showing a schematic arrangement of an optical recording medium and an optical pickup in accordance with a first embodiment of the invention.
Figure 13:
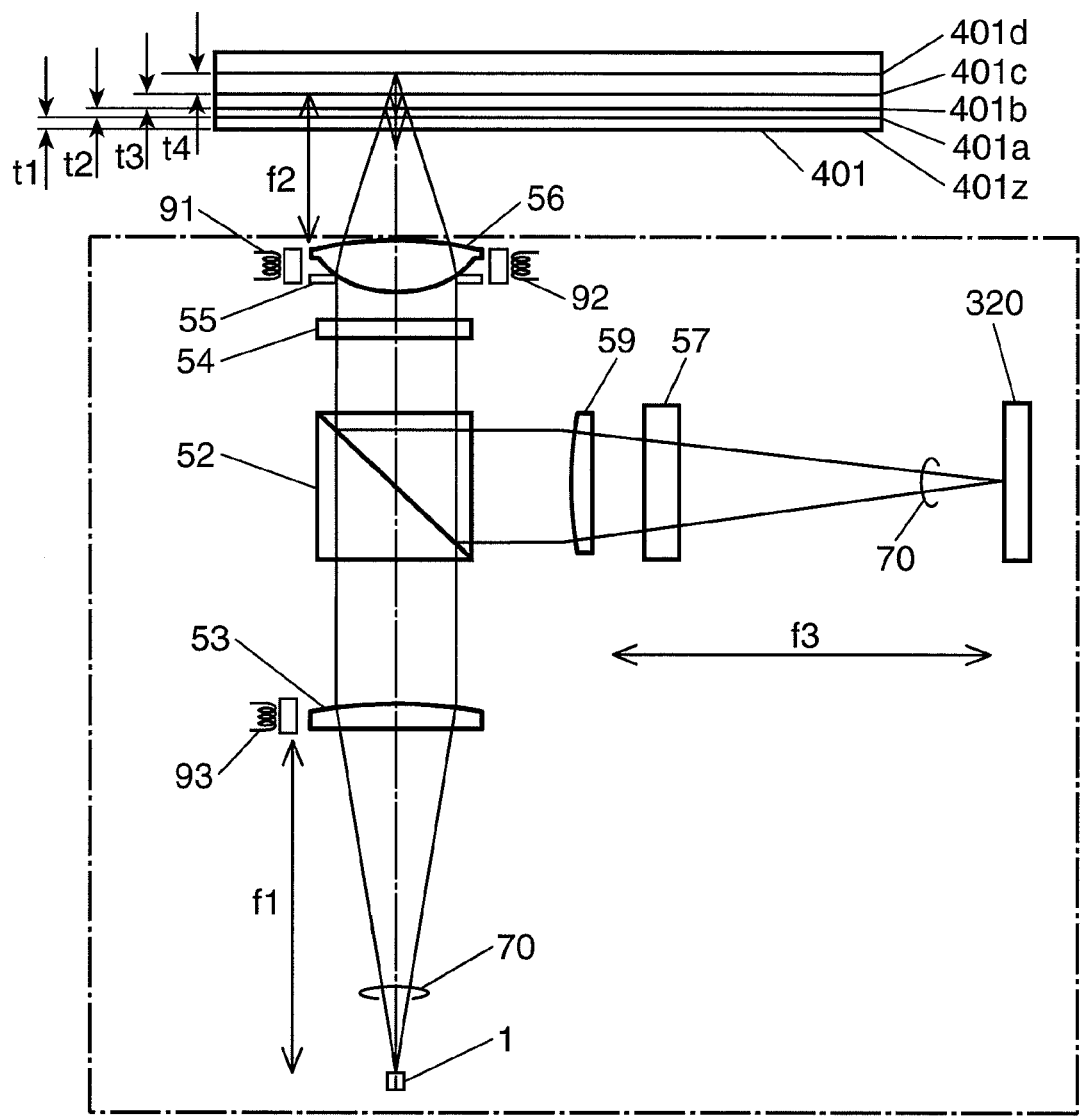
FIG. 13 is a diagram showing an arrangement of a conventional optical recording medium and optical pickup.

FIG. 1 is a diagram showing a schematic arrangement of an optical recording medium and an optical pickup in accordance with the first embodiment of the invention. FIG. 2 is a diagram showing a layer structure of the optical recording medium in accordance with the first embodiment of the invention. An optical pickup 201 irradiates laser light having a wavelength λ of 405 nm onto an optical recording medium 40 to reproduce a signal recorded in the optical recording medium 40. Since the arrangement of the optical pickup 201 shown in FIG. 1 is substantially the same as the arrangement of the optical pickup shown in FIG. 13, detailed description thereof is omitted herein.

The optical recording medium 40 has four information recording surfaces. As shown in FIG. 2, the optical recording medium 40 has, in the order from a side closest to a surface 40z of the optical recording medium 40, a first information recording surface 40a, a second information recording surface 40b, a third information recording surface 40c, and a fourth information recording surface 40d.

The optical recording medium 40 is further provided with a cover layer 42, a first intermediate layer 43, a second intermediate layer 44, and a third intermediate layer 45. The thickness t1 of the cover layer 42 represents a thickness of a substrate from the surface 40z to the first information recording surface 40a, the thickness t2 of the first intermediate layer 43 represents a thickness of the substrate from the first information recording surface 40a to the second information recording surface 40b, the thickness t3 of the second intermediate layer 44 represents a thickness of the substrate from the second information recording surface 40b to the third information recording surface 40c, and the thickness t4 of the third intermediate layer 45 represents a thickness of the substrate from the third information recording surface 40c to the fourth information recording surface 40d.

The distance d1 (≈t1) represents a distance from the surface 40z to the first information recording surface 40a, the distance d2 (≈t1+t2) represents a distance from the surface 40z to the second information recording surface 40b, the distance d3 (≈t1+t2+t3) represents a distance from the surface 40z to the third information recording surface 40c, and the distance d4 (≈t1+t2+t3+t4) represents a distance from the surface 40z to the fourth information recording surface 40d.

Figure 3:
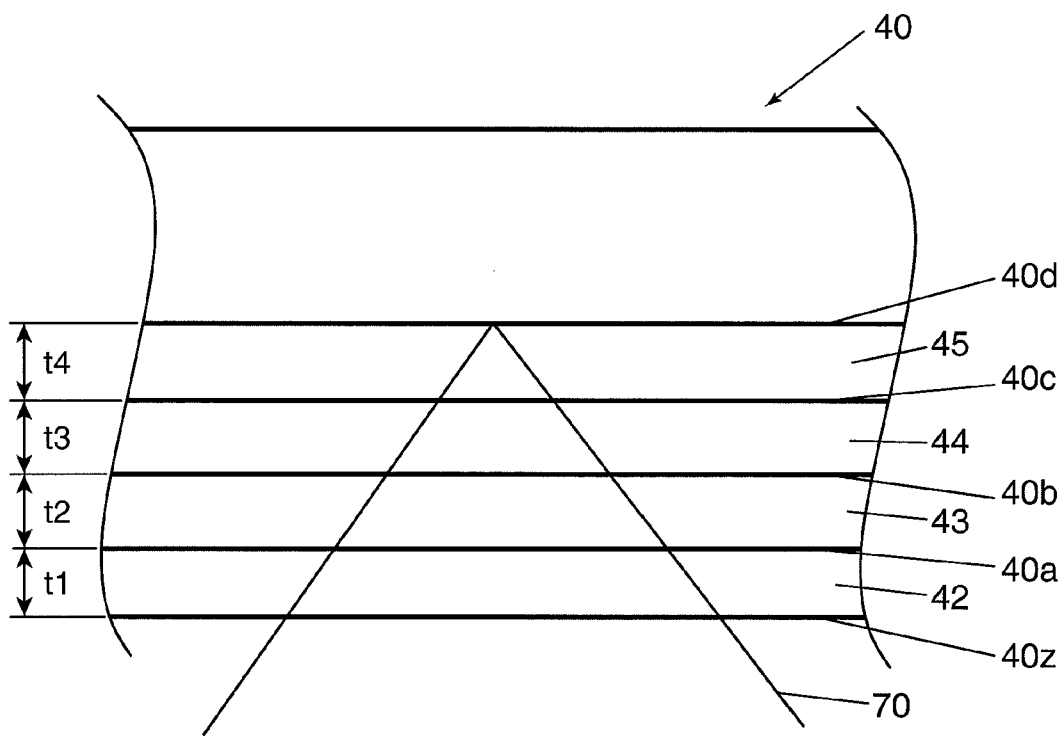
FIG. 3 is a diagram showing reflection light from a fourth information recording surface, in the case where a beam is collected on the fourth information recording surface.
Figure 4:
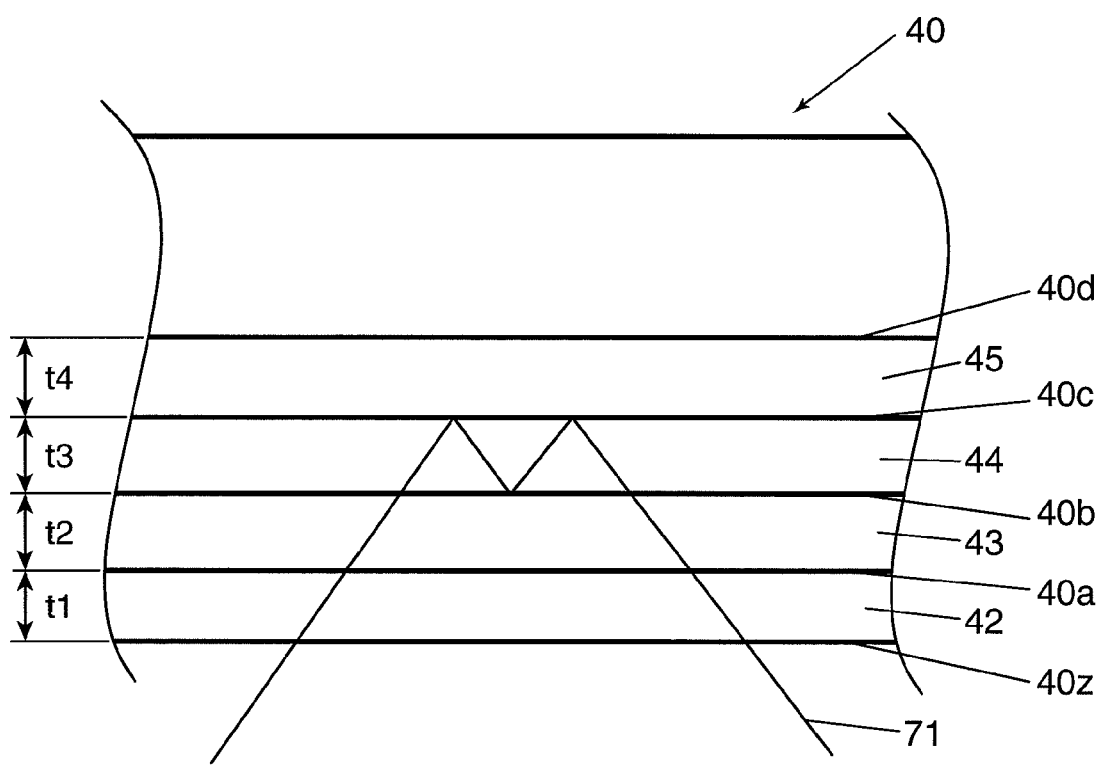
FIG. 4 is a diagram showing reflection light from a third information recording surface and a second information recording surface, in the case where a beam is collected on the fourth information recording surface.
Figure 5:
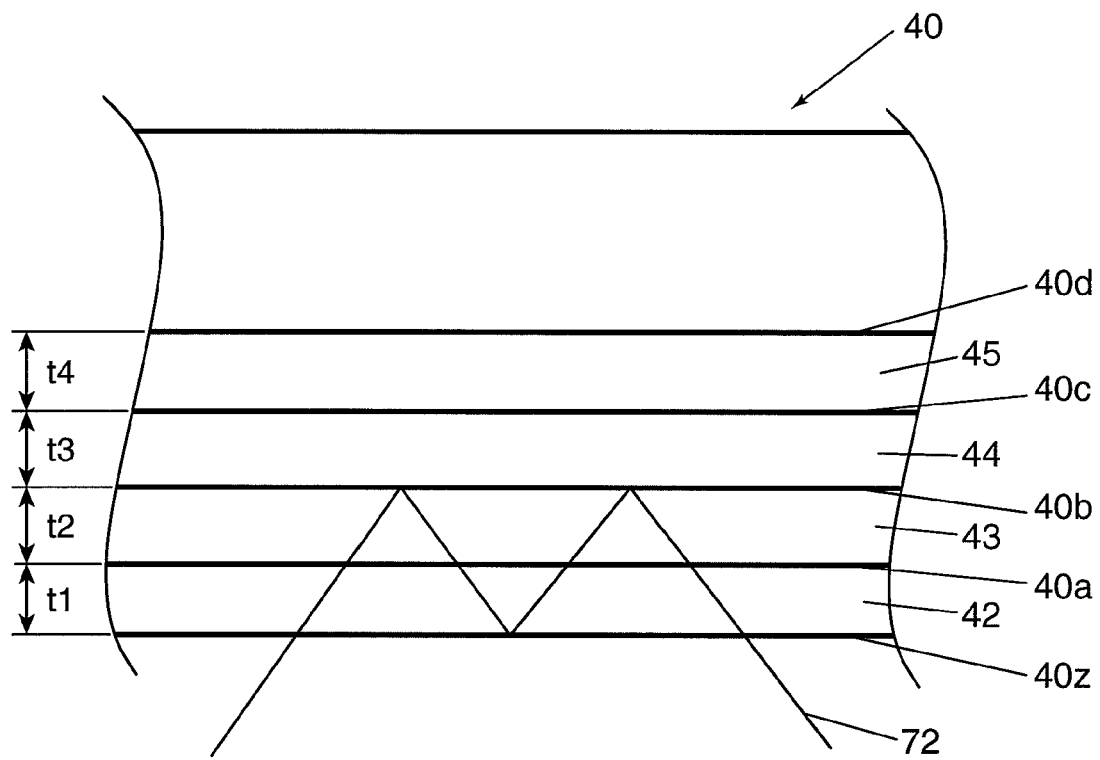
FIG. 5 is a diagram showing reflection light from the second information recording surface and a surface of the optical recording medium, in the case where a beam is collected on the fourth information recording surface.
Figure 6:
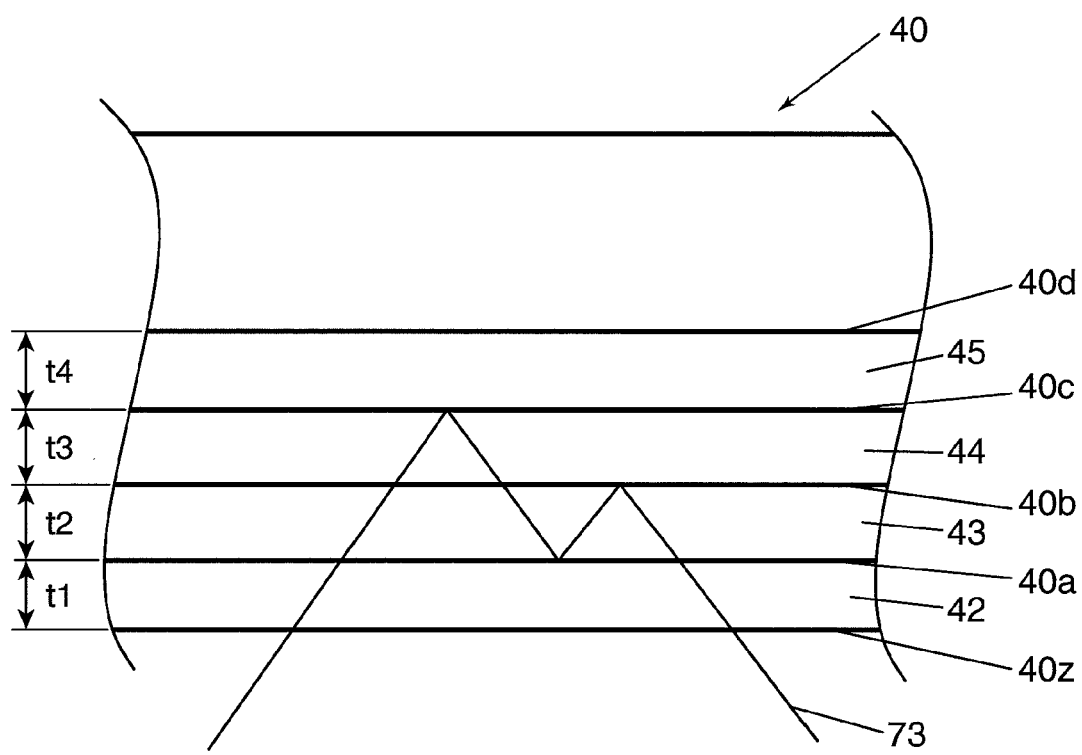
FIG. 6 is a diagram showing reflection light from the third information recording surface, a first information recording surface, and the second information recording surface, in the case where a beam is collected on the fourth information recording surface.

Now, problems to be solved in the case where an optical recording medium has four information recording surfaces are described. Coherence by reflection light on multiple surfaces is described referring to FIGS. 3 through 7, as a first problem to be solved. FIG. 3 is a diagram showing reflection light from the fourth information recording surface 40d, in the case where a beam is collected on the fourth information recording surface 40d. FIG. 4 is a diagram showing reflection light from the third information recording surface 40c and the second information recording surface 40b, in the case where a beam is collected on the fourth information recording surface 40d. FIG. 5 is a diagram showing reflection light from the second information recording surface 40b and the surface 40z, in the case where a beam is collected on the fourth information recording surface 40d. FIG. 6 is a diagram showing reflection light from the third information recording surface 40c, the first information recording surface 40a, and the second information recording surface 40b, in the case where a beam is collected on the fourth information recording surface 40d.

As shown in FIG. 3, a light flux collected on the fourth information recording surface 40d for information reproducing or recording is split into the following light beams by semi-translucency of an information recording layer (an information recording surface).

Specifically, a light flux collected on the fourth information recording surface 40d for information reproducing or recording is split into: a beam 70 to be reflected on the fourth information recording surface 40d, as shown in FIG. 3; a beam 71 (back focus light with respect to the information recording layer) to be reflected on the third information recording surface 40c, focused and reflected on the backside of the second information recording surface 40b, and reflected on the third information recording surface 40c, as shown in FIG. 4; a beam 72 (back focus light with respect to the medium surface) reflected on the second information recording surface 40b, focused and reflected on the backside of the surface 40z, and reflected on the second information recording surface 40b, as shown in FIG. 5; and a beam 73 which is not focused on the medium surface and the backside surfaces of the information recording surfaces, but is reflected in the order of the third information recording surface 40c, the backside of the first information recording surface 40a, and the second information recording surface 40b, as shown in FIG. 6.

For instance, in the case where the distance (thickness t4) between the fourth information recording surface 40d and the third information recording surface 40c, and the distance (thickness t3) between the third information recording surface 40c and the second information recording surface 40b are equal to each other, the beam 70 and the beam 71 are incident into a photodetector 320 with an identical optical path length and an identical light flux diameter. Similarly, in the case where the distance (thickness t4+thickness t3) between the fourth information recording surface 40d and the second information recording surface 40b, and the distance (thickness t2+thickness t1) between the second information recording surface 40b and the surface 40z are equal to each other, the beam 70 and the beam 72 are incident into the photodetector 320 with an identical optical path length and an identical light flux diameter. In the case where the distance (thickness t2) between the second information recording surface 40b and the first information recording surface 40a, and the distance (thickness t4) between the fourth information recording surface 40d and the third information recording surface 40c are equal to each other, the beam 70 and the beam 73 are incident into the photodetector 320 with an identical optical path length and an identical light flux diameter.

The light amounts of the beams 71 through 73 as reflection light from multiple surfaces are small, as compared with the light amount of the beam 70. However, since each of the beams is incident into the photodetector 320 with an identical optical path length and an identical light flux diameter, an influence by coherence between the beams is increased. Further, a light receiving amount by the photodetector 320 is greatly varied depending on a small change in thickness between the information recording layers, which makes it difficult to detect a stable signal.

Figure 7:
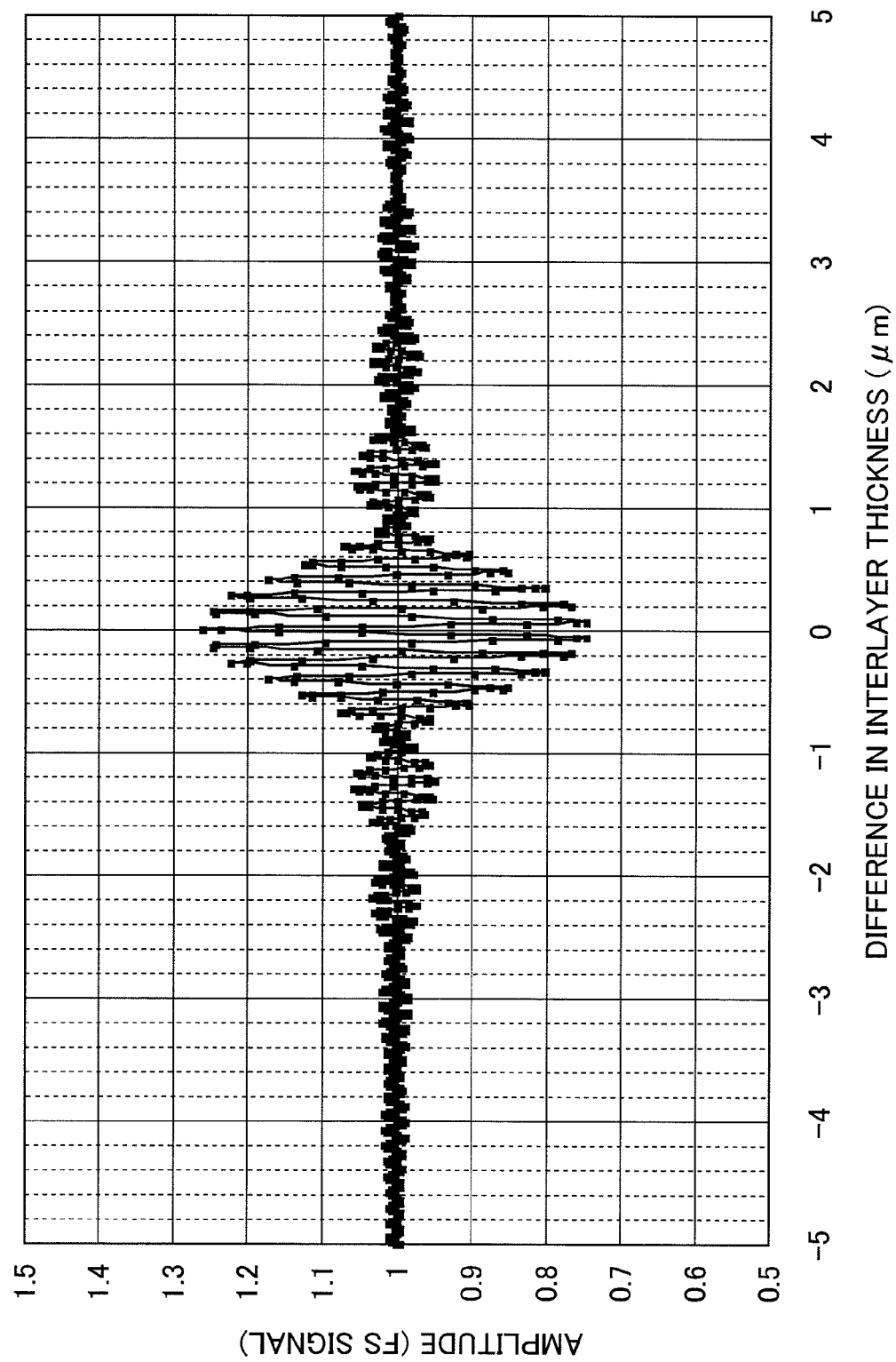
FIG. 7 is a diagram showing a relation between a difference in interlayer thickness, and an amplitude of an FS signal.

FIG. 7 is a diagram showing a relation between a difference in interlayer thickness, and an amplitude of an FS signal. FIG. 7 shows an amplitude of an FS signal with respect to a difference in interlayer thickness, in the case where the light amount ratio between the beam 70, and the beam 71, the beam 72, or the beam 73 is set to 100:1, and the refractive indexes of the cover layer 42 and the first intermediate layer 43 are each set to 1.57. Referring to FIG. 7, the axis of abscissas indicates a difference in interlayer thickness, and the axis of ordinate indicates an amplitude of an FS signal. The FS signal amplitude is a value obtained by normalizing reflection light only composed of the beam 70 by a DC light amount detected by the photodetector 320. The difference in interlayer thickness represents a difference in thickness between the intermediate layers, and a difference in thickness between the cover layer and the respective intermediate layers. As shown in FIG. 7, it is obvious that the FS signal is sharply changed when the difference in interlayer thickness becomes 1 µm or less.

Similarly to the beam 72 shown in FIG. 5, in the case where the difference between the thickness t1 of the cover layer 42, and the sum of the thicknesses (t2+t3+t4) of the first through the third intermediate layers 43 through 45 is 1 µm or less, a problem such as variation of the FS signal also occurs.

Figure 8:
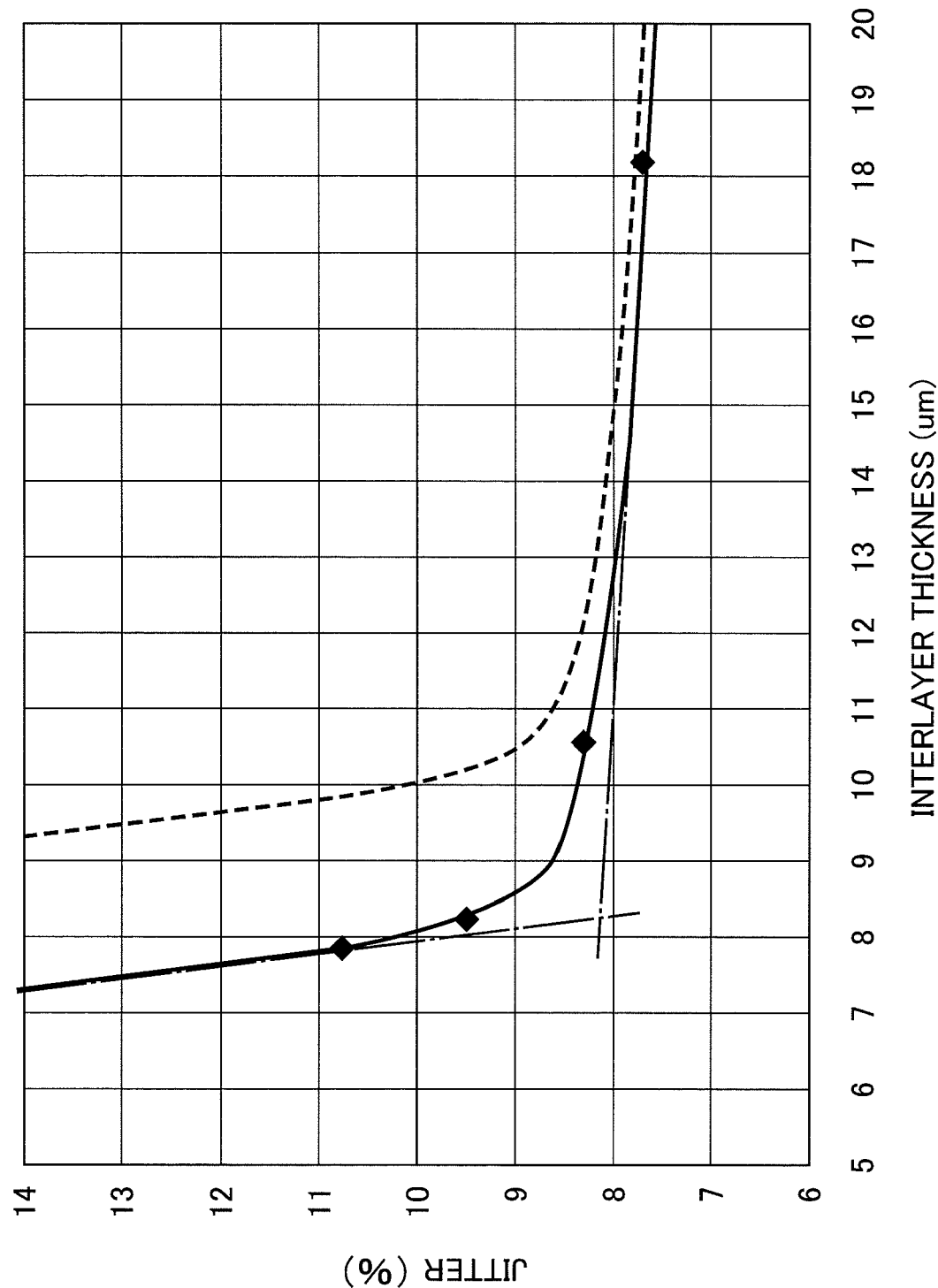
FIG. 8 is a diagram showing a relation between an interlayer thickness of an optical recording medium having reflectances of information recording layers substantially equal to each other, and a jitter.

As a second problem to be solved, it is necessary to secure an interlayer distance of a predetermined value or more, because an exceedingly small interlayer distance between adjacent information recording surfaces causes an influence of crosstalk from the adjacent information recording surface. In view of this, various interlayer thicknesses are investigated, and an interlayer thickness which minimizes the influence is determined. FIG. 8 is a diagram showing a relation between an interlayer thickness of an optical disc, wherein reflectances of the respective information recording layers are substantially equal to each other, and a jitter. Referring to FIG. 8, the axis of abscissas indicates an interlayer thickness, and the axis of ordinate indicates a jitter value. As the interlayer thickness is reduced, the jitter is deteriorated. An inflection point in FIG. 8 is about 8 µm, and in the case where the interlayer thickness becomes 8 µm or less, the jitter is seriously deteriorated.

Generally, in producing an optical disc, there is a case that reflectances of respective information recording layers differ from each other by about 1.5 times. For instance, in the case where the reflectance of an information recording layer other than a targeted information recording layer to be reproduced or recorded is 1.5 times of the reflectance of the targeted information recording layer, an influence by coherence on the targeted information recording layer is about √1.5 times in terms of amplitude ratio of light. Accordingly, a jitter with respect to an interlayer thickness is as shown by the broken line in FIG. 8. Specifically, if the minimum value of interlayer thickness is increased by 2 µm i.e. is set from 8 µm to 10 µm or more, the light amount density of stray light from the other information recording layer to be detected by the photodetector becomes: reflectance $1.5 \times (8/10)^2 = 0.96$. Thus, an increment of reflection efficiency of the other information recording layer can be offset. Consequently, an optimum minimum value of the interlayer thickness is 10 µm.

Figure 2:
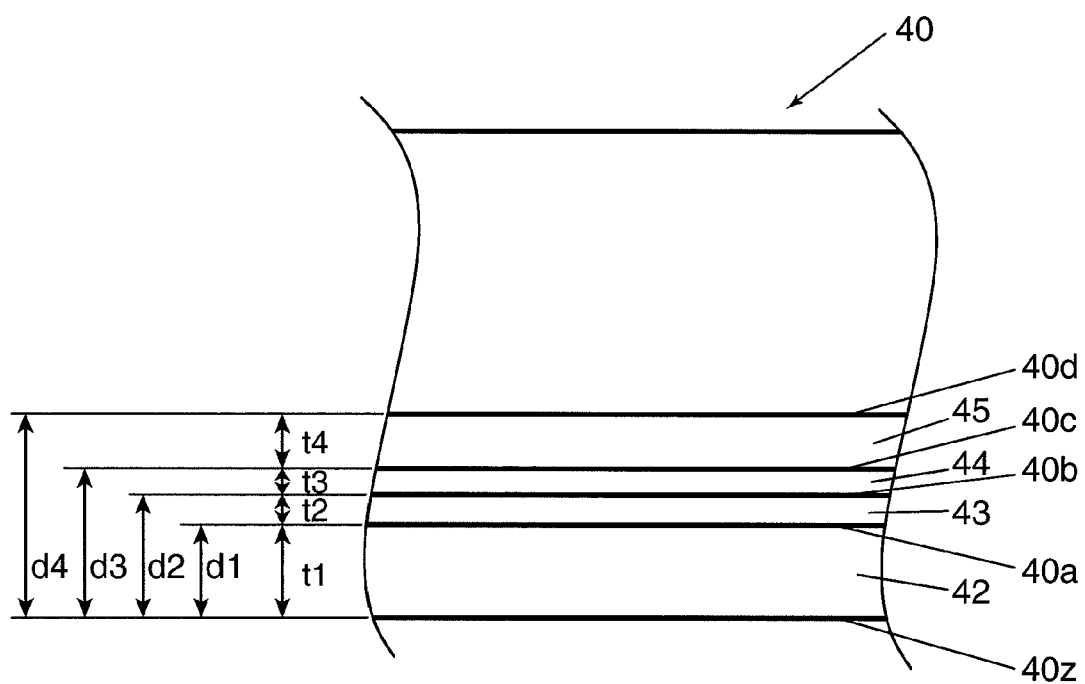
FIG. 2 is a diagram showing a layer structure of the optical recording medium in accordance with the first embodiment of the invention.

Referring to FIG. 2, an arrangement of the optical recording medium 40 in accordance with the first embodiment of the invention is described. In the first embodiment, the structure of a four-layer disc (the optical recording medium 40) is defined in such a manner as to satisfy the following conditions in order to eliminate an adverse effect of reflection light from the other information recording layer or a disc surface, considering a thickness variation among products.

Condition (1): The thickness t1 of the cover layer 42 is set larger than 50 µm to make the thickness t1 of the cover layer 42 larger than the thickness of a cover layer of a conventional optical disc (t1>50 µm).

Condition (2): The difference between the thickness t1 of the cover layer 42, and the sum (t2+t3+t4) of the thicknesses t2 through t4 of the first through the third intermediate layers 43 through 45 is set to 1 µm or more. It is desirable to set the standard value of the distance d4 to 100 µm, which is equal to the standard value of a commercially available BD. By combining the condition (2) with the condition (1) where t1>50 µm, the optical recording medium 40 satisfies a condition: t1−(t2+t3+t4)≧1 µm.

Condition (3): The difference between the sum (t1+t2) of the thickness t1 of the cover layer 42 and the thickness t2 of the first intermediate layer 43, and the sum (t3+t4) of the thicknesses t3 of the second intermediate layer 44 and the thickness t4 of the third intermediate layer 45 is set to 1 µm or more. It is obvious that the condition (3) is automatically satisfied, if the conditions (1) and (2) are satisfied.

Condition (4): The difference between any two values out of the thicknesses t1, t2, t3, and t4 is set to 1 µm or more in any case.

Condition (5): It is necessary to secure 10 µm or more, as a minimum value of the interlayer thickness (the thickness of the intermediate layer), as described above. In view of this, the thicknesses t2, t3, and t4 are each set to 10 µm or more.

Condition (6): The thickness t3 is set larger than the thickness t4, and the thickness t4 is set larger than the thickness t2. The second information recording surface 40b is sandwiched between the first information recording surface 40a and the third information recording surface 40c. The third information recording surface 40c is sandwiched between the second information recording surface 40b and the fourth information recording surface 40d. Both of the second information recording surface 40b and the third information recording surface 40c are affected by a crosstalk signal from the corresponding adjacent two surfaces. Accordingly, it is necessary to provide a measure for reducing a crosstalk. It is possible to reduce a crosstalk from the other one of the second information recording surface 40b and the third information recording surface 40c in reproducing information from one of the second information recording surface 40b and the third information recording surface 40c by increasing the thickness (thickness t3) of the second intermediate layer 44. Accordingly, it is desirable to set the thickness t3 to a largest value among the thicknesses t2, t3, and t4. Further, a reduced distance between the respective information recording layers and the surface 40z increases a tilt margin. In view of this, preferably, the thickness t2 of the first intermediate layer 43 is set to a small value, and the thickness t4 of the third intermediate layer 45 is set to a large value. Based on the above investigation, the thicknesses t2, t3, and t4 satisfy a condition: t3>t4>t2.

Condition (7): The distance d4 from the surface 40z to the fourth information recording surface 40d farthest from the surface 40z is substantially set to 100 μm. This is advantageous in making the optical recording medium 40 compatible with a BD (Blu-ray Disc) having a largest capacity among the currently and commercially available optical discs, and sufficiently securing a system margin such as a tilt margin.

In the following, let us consider a structure capable of maximizing an allowable production error or variation of a cover layer thickness and an intermediate layer thickness under the conditions (1) through (7).

Let it be assumed that production variations of the cover layer 42, and the first through the third intermediate layers 43 through 45 are the same i.e. ±eμm. In this case, center values of the respective interlayer thicknesses t2 through t4 which satisfy the conditions (1) through (7) are expressed by the following equations (1) through (3), considering an upper limit and a lower limit of each of the interlayer thicknesses t2 through t4.

$$t2=10+e \text{ (μm)} \quad (1)$$

$$t4=(t2+e)+1+e=10+3e+1 \text{ (μm)} \quad (2)$$

$$t3=(t4+e)+1+e=10+5e+2 \text{ (μm)} \quad (3)$$

The lower limit of the thickness t1 should be larger than the sum of the upper limits of the thicknesses t2 through t4 by 1 μm to satisfy the condition (2). Accordingly, t1=34+13e based on the following equation (4).

$$t1-e=(t2+t3+t4+3e)+1 \text{ (μm)}=(10+e)+(10+5e+2)+(10+3e+1)+3e+1=34+12e \quad (4)$$

The sum of the thicknesses t1 through t4 is 100 μm, based on the condition (7). Accordingly, the variation "e" is expressed by: e=33/22=1.5 (μm), based on the following equation (5).

$$t1+t2+t3+t4=(10+e)+(10+5e+2)+(10+3e+1)+(34+13e)=67+22e=100 \text{ (μm)} \quad (5)$$

The standard values of the thicknesses t1 through t4 and the distances d1 through d4 are respectively as follows:

t1=53.5 (μm)
t2=11.5 (μm)
t3=19.5 (μm)
t4=15.5 (μm)
d1=t1=53.5 (μm)
d2=d1+t2=65.0 (μm)
d3=d2+t3=84.5 (μm)
d4=100 (μm)

In this example, assuming that upper limits of production variations of the cover layer thickness t1 and the respective interlayer thicknesses t2 through t4 are the same, as far as the variation of the respective thicknesses is smaller than the upper limit, the conditions (1) through (7) are necessarily satisfied. In other words, the variation "e" is a sufficient condition. Even if the error of the thickness t1 exceeds the variation "e", as far as the thicknesses of the other intermediate layers are approximate to a reference value, and the conditions (1) through (7) are satisfied, a certain signal quality can be secured. Further, the distance from the surface 40z to the respective information recording layers should lie in a certain error range to obtain a satisfactory quality of a focus error signal in performing a focus pull-in operation.

In view of this, the optical recording medium 40 having four information recording surfaces desirably satisfies a condition: t3−t4≧1 μm, t4−t2≧1 μm, t2≧10 μm, t1−(t2+t3+t4)≧1 μm, 53.5 μm−E1≦d1≦53.5 μm+E1, 65.0 μm−E2≦d2≦65.0 μm+E2, 84.5 μm−E3≦d3≦84.5 μm+E3, and 100.0 μm−E4≦d4≦100.0 μm+E4, where d1 is a distance from the surface 40z of the optical recording medium 40 to the first information recording surface 40a closest to the surface 40z of the optical recording medium 40, d2 is a distance from the surface 40z of the optical recording medium 40 to the second information recording surface 40b second closest to the surface 40z of the optical recording medium 40, d3 is a distance from the surface 40z of the optical recording medium 40 to the third information recording surface 40c third closest to the surface 40z of the optical recording medium 40, and d4 is a distance from the surface 40z of the optical recording medium 40 to the fourth information recording surface 40d farthest from the surface 40z of the optical recording medium 40; t1(=d1) is a thickness between the surface 40z of the optical recording medium 40 and the first information recording surface 40a, t2(=d2−d1) is a thickness between the first information recording surface 40a and the second information recording surface 40b, t3(=d3−d2) is a thickness between the second information recording surface 40b and the third information recording surface 40c, and t4(=d4−d3) is a thickness between the third information recording surface 40c and the fourth information recording surface 40d; and E1, E2, E3, and E4 are respectively tolerances of the distances d1, d2, d3, and d4.

The above arrangement enables to prevent image formation on the backside of the surface 40z of the optical recording medium 40, and reduce coherence between reflection light from the information recording surfaces 40a through 40d to thereby improve the quality of a servo signal and a reproduction signal. The above arrangement also enables to set a distance between the surface 40z of the optical recording medium 40, and the first information recording surface 40a closest to the surface 40z of the optical recording medium 40 to a large value to thereby suppress deterioration of a reproduction signal, resulting from a damage or a smear on the surface 40z of the optical recording medium 40.

The tolerance E1 should be set to 6 μm, considering a degree of deterioration of a focus error signal.

Further, setting the tolerance E1 to 5 μm enables to further stably perform a focus pull-in operation with respect to the first information recording surface 40a closest to the surface 40z.

Furthermore, the tolerance E1 is determined only by an error of the thickness t1 of the cover layer 42, and is free from an influence of the thicknesses of the other intermediate layers. In view of this, it is possible to further stably perform a focus pull-in operation with respect to the first information recording surface 40a closest to the surface 40z by setting the tolerance E1 to 3 μm, considering an advantage of the embodiment that the optical recording medium 40 can be produced with high precision.

Similarly to the above, the tolerance E2 should be set to 6 μm, considering a degree of deterioration of a focus error signal.

Further, setting the tolerance E2 to 5 μm enables to further stably perform a focus pull-in operation with respect to the second information recording surface 40b second closest to the surface 40z.

If the tolerance E1 is set to a lowest value i.e. 3 μm, and an error of the thickness t2 is defined as the variation "e" where e=1.5 μm, it is possible to reduce the tolerance E2 to about 4.5 μm. This arrangement is advantageous in further stably performing a focus pull-in operation with respect to the second information recording surface 40b second closest to the surface 40z.

It is necessary to set the tolerances E3 and E4 to 6 μm, considering a degree of deterioration of a focus error signal. If the tolerances E3 and E4 are set to 5 μm, it is possible to further stably perform a focus pull-in operation with respect to the third information recording surface 40c third closest to the surface 40z, and the fourth information recording surface 40d farthest from the surface 40z.

In view of the above, the most preferable arrangement of the optical recording medium 40 is: 50.5 μm≦d1≦56.5 μm, 60.5 μm≦d2≦69.5 μm, 78.5 μm≦d3≦90.5 μm, and 94.0 μm≦d4≦106.0 μm.

Further, since t3−t4≧1 μm, and t4−t2≧1 μm, the thicknesses t2 and t4 should be smaller than the thickness t3 by 1 μm or more. However, the upper limit of the thickness t3 is not included in the above condition. The upper limit of the thickness t3 can be derived from an equation: t3=d3−d2. Since the distance d3 is not smaller than 84.5 μm−E3, and not larger than 84.5 μm+E3, and the distance d2 is not smaller than 65.0 μm−E2, and not larger than 65.0 μm+E2, the maximum value of the thickness t3 is set to E3+E2+19.5 μm.

For instance, if the tolerances E3 and E2 are each set to 6 μm, the maximum value of the thickness t3 is set to 31.5 μm. However, stable focus control cannot be resumed, unless a spherical aberration amount is adjusted with respect to the third information recording surface 40c as a focus jumping destination, in focus jumping from the second information recording surface 40b to the third information recording surface 40c, because the amplitude and the sensitivity of a focus error signal may be deteriorated. In view of this, it is desirable to set the tolerance of the thickness t3 to 6 μm at most. Thus, it is desirable to set the thickness t3 to satisfy a condition: t3≦25.5 μm.

Further, focus jumping can be more stably performed by suppressing the tolerance of the thickness t3 to 5 μm. In view of this, it is desirable to set the thickness t3 to satisfy a condition: t3≦24.5 μm. Furthermore, it is possible to suppress the tolerance of the thickness t3 to about 2.5 μm, considering a range capable of producing an optical recording medium (an optical disc). In view of this, it is more desirable to set the thickness t3 to satisfy a condition: t3≦22.0 μm.

Similarly to the thickness t3 of the second intermediate layer 44, focus jumping can be more stably performed by suppressing the tolerances of the thickness t2 of the first intermediate layer 43, and the thickness t4 of the third intermediate layer 45 to 5 μm. In view of this, it is desirable to set the thickness t2 in the range of not smaller than 10.0 μm as a lower limit and not larger than 16.5 μm (11.5 μm+5 μm), the thickness t3 in the range of 19.5 μm±5 μm i.e. in the range of not smaller than 14.5 μm and not larger than 24.5 μm, and the thickness t4 in the range of not smaller than 11 μm (=the lower limit of the thickness t2+1 μm) and not larger than 20.5 μm (15.5 μm+5 μm). Since t1=d1, it is desirable to set the thickness t1 in the range of not smaller than 50.5 μm to not larger than 56.5 μm.

The above condition is a condition necessary for stably reproducing a desirable information signal. Combination which satisfies the above conditions, out of the various combinations of the thicknesses t1 through t4 of the cover layer and the intermediate layers, represents a structure allowable for the optical recording medium 40. However, producing an optical disc suitable for the conditions without considering the combinations by setting the tolerances of the thicknesses t1 through t4 of the cover layer and the intermediate layers within a predetermined narrow range, rather than judging whether the combinations of the thicknesses t1 through t4 of the cover layer and the intermediate layers satisfy the conditions or not, is advantageous in easily setting a target value in production, and facilitating condition setting. As another effect, clarifying the range free of performance drawback as described above enables to discriminate an optical recording medium which has been produced with a value slightly out of the target value, as a non-defective product. Thus, the product yield can be increased to thereby suppress an increase in product cost.

Next, another point has been investigated, i.e. a tolerance of the thickness of a feasible intermediate layer, and a layer structure as a sufficient condition for avoiding the aforementioned back focus problem and avoiding an interlayer crosstalk problem. As a result of experimental investigation of the thickness tolerance of a feasible intermediate layer, we found that the thickness tolerance of an intermediate layer of ±1.5 μm enables mass production. In the aspect of avoiding the interlayer crosstalk problem, the minimum value of the thickness t2 is set to 10 μm. The standard value of the thickness t2 should be 11.5 μm or more to secure a production tolerance of 1.5 μm. Lastly, a condition: t1−(t2+t3+t4)≧1 should be considered to avoid the back focus problem. In view of this, the standard value of the thickness of the intermediate layer is set to a requisite minimum value. Accordingly, the standard value of the thickness t2 is set to 11.5 μm. Further, the upper limit of the thickness t2 is set to 13 μm to secure the production tolerance of 1.5 μm in a range larger than the standard value.

In the aspect of avoiding the back focus problem, a condition: t4−t2≧1 μm should be satisfied. In view of this, the minimum value of the thickness t4 is set to 14 μm. Since the standard value of the thickness t4 should be 15.5 μm or more to secure the production tolerance of 1.5 μm, the standard value of the thickness t4 is set to 15.5 μm. Further, the upper limit of the thickness t4 is set to 17 μm to secure the production tolerance of 1.5 μm in a range larger than the standard value.

In the aspect of avoiding the back focus problem, a condition: t3−t4≧1 μm should also be satisfied. In view of this, the minimum value of the thickness t3 is set to 18 μm. Since the standard value of the thickness t3 should be 19.5 μm or more to secure the production tolerance of 1.5 μm, the standard value of the thickness t3 is set to 19.5 μm. Further, the upper limit of the thickness t3 is set to 21 μm to secure the production tolerance of 1.5 μm in a range larger than the standard value.

In the aspect of avoiding the back focus problem, a condition: t1−(t2+t3+t4)≧1 μm should also be satisfied. If the production tolerance of 1.5 µm is secured, the upper limit of the sum (t2+t3+t4) of the thicknesses t2 through t4 is set to 51 µm, because the upper limits of the thicknesses t2, t3, and t4 are respectively 13 µm, 17 µm, and 21 µm. Accordingly, if the lower limit of the thickness t1 of the cover layer 42 is set to 52 µm, the condition: t1−(t2+t3+t4)≧1 µm is satisfied. The standard value of the thickness t1 should be 53.5 µm or more to secure the production tolerance of 1.5 µm.

In this example, let it be assumed that the standard value of the distance d4 is set to 100 µm. The distance d4 is a sum of the thicknesses t1 through t4. If the standard value of the thickness t1 is set to 53.5 µm, the sum of the standard value of the thicknesses t1, and the standard values of the thicknesses t2 through t3 reaches 100 µm. In this case, there is no more room for increasing the standard values of the thicknesses t1 through t4. In view of this, the standard values of the thicknesses t1, t2, t3, and t4 are respectively set to 53.5 µm, 11.5 µm, 15.5 µm, and 19.5 µm. The above investigation also led to a conclusion that setting the standard values of the thicknesses t1 through t4 as described above is the only way to secure the production tolerance of 1.5 µm, avoid the interlayer crosstalk problem and the back focus problem, and set the standard value of the distance d4 to 100 µm.

In view of the above, it is desirable to set the standard value of the thickness t1 in the range of not smaller than 52.0 µm and not larger than 55.0 µm, the standard value of the thickness t2 in the range of not smaller than 10.0 µm and not larger than 13.0 µm, the standard value of the thickness t3 in the range of not smaller than 18.0 µm and not larger than 21.0 µm, and the standard value of the thickness t4 in the range of not smaller than 14.0 µm and not larger than 17.0 µm.

In other words, it is desirable to set the standard value of the thickness t1 to 53.5 µm, the standard value of the thickness t2 to 11.5 µm, the standard value of the thickness t3 to 19.5 µm, and the standard value of the thickness t4 to 15.5 µm; and to suppress an error of each of the thicknesses t1 through t4 to ±1.5 µm or less.

There are some conditional expressions relating to plural parameters in a condition (hereinafter, called as a prerequisite condition) to be satisfied by the optical recording medium derived from the above conditions (1) through (7). Thus, there are multitudes of conditions to be simultaneously considered to satisfy all the conditions, which makes it very difficult to determine the thickness of each layer. Also, even if the condition of each layer satisfies the prerequisite condition, there is a case that no production error is allowed depending on a condition, which makes it very difficult to actually produce an optical recording medium.

For instance, in the case where a film thickness of a certain intermediate layer is set to a predetermined value, there is a case that an error margin is extremely small, although the film thickness conditions of the other intermediate layers satisfy the conditions of the respective layers. Accordingly, even if the prerequisite condition is clarified, it is very difficult to determine the condition of each layer in such a manner that all the layers including a light transmissive layer and intermediate layers satisfy the prerequisite condition; and to set the condition of each layer in such a manner that an allowable production error with respect to a certain layer is not set to an exceedingly small value, even if the prerequisite condition is satisfied.

In view of the above, in the first embodiment, not only the prerequisite condition is defined, but also conditions to be considered in producing the optical recording medium are defined as recommended conditions.

The above arrangement enables to reduce the number of parameters which should be simultaneously considered, and easily set a target value of each layer at the time of producing the optical recording medium. The above arrangement also enables to solve a problem relating to production that a certain layer has an extremely small error margin. Further, since the above arrangement enables to set the error margin of all the layers to 1.5 µm or more, the optical recording media can be mass-produced.

A method for producing the optical recording medium 40 having four information recording surfaces has a step of forming, on a substrate, the cover layer (light transmissive layer) 42, the first information recording surface 40a, the first intermediate layer 43, the second information recording surface 40b, the second intermediate layer 44, the third information recording surface 40c, the third intermediate layer 45, and the fourth information recording surface 40d. The first through the fourth information recording surfaces 40a through 40d, the first through the third intermediate layers 43 through 45, and the cover layer 42 are formed in such a manner that the thickness t1 of the cover layer 42, and the thicknesses t2 through t4 of the first through the third intermediate layers 43 through 45 satisfy a condition: 52.0 µm≦t1≦55.0 µm, 10.0 µm≦t2≦13.0 µm, 18.0 µm≦t3≦21.0 µm and 14.0 µm≦t4≦17.0 µm.

The optical recording medium 40 produced by the above production method satisfies a condition: t3−t4≧1 µm, t4−t2≧1 µm, t2≧10 µm, and t1−(t2+t3+t4)≧1 µm. The optical recording medium 40 produced by the above production method further satisfies a condition: 60.5 µm≦d2≦69.5 µm, 78.5 µm≦d3≦90.5 µm, 94.0 µm≦d4≦106.0 µm, 50.5 µm≦t1≦56.5 µm, 10.0 µm≦t2≦16.5 µm, 14.5 µm≦t3≦24.5 µm, and 11.0 µm≦t4≦20.5 µm.

Further, the first through the fourth information recording surfaces 40a through 40d, the first through the third intermediate layers 43 through 45, and the cover layer 42 are formed in such a manner that the standard value of the thickness t1 is set to 53.5 µm, the standard value of the thickness t2 is set to 11.5 µm, the standard value of the thickness t3 is set to 19.5 µm, and the standard value of the thickness t4 is set to 15.5 µm; and that the tolerances of the thickness t1 of the cover layer 42 and the thicknesses t2 through t4 of the first through the third intermediate layers 43 through 45 are each set to 1.5 µm or less.

(Second Embodiment)

Figure 9:
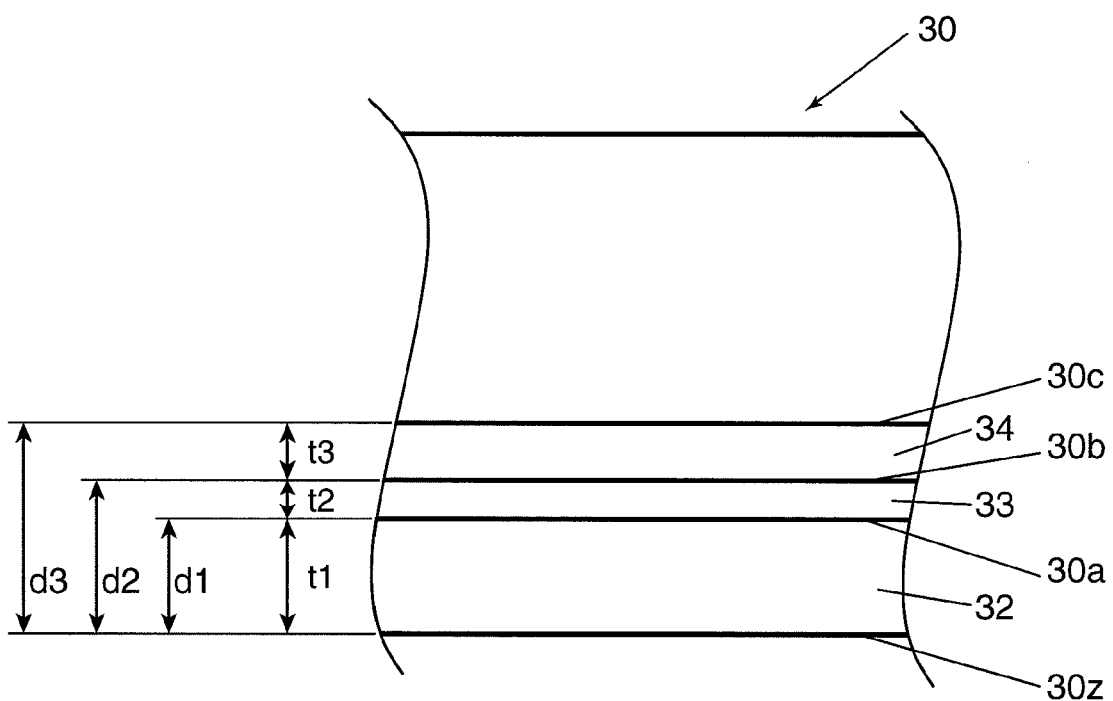
FIG. 9 is a diagram showing a layer structure of an optical recording medium in accordance with a second embodiment of the invention.

An optical recording medium having four information recording surfaces is described in the first embodiment. An optical recording medium having three information recording surfaces is described in the second embodiment. FIG. 9 is a diagram showing a layer structure of the optical recording medium in accordance with the second embodiment of the invention.

An optical recording medium 30 has three information recording surfaces. As shown in FIG. 9, the optical recording medium 30 has, in the order from a side closest to a surface 30z of the optical recording medium 30, a first information recording surface 30a, a second information recording surface 30b, and a third information recording surface 30c. The optical recording medium 30 is further provided with a cover layer 32, a first intermediate layer 33, and a second intermediate layer 34.

The thickness t1 of the cover layer 32 represents a thickness of a substrate from the surface 30z to the first information recording surface 30a, the thickness t2 of the first intermediate layer 33 represents a thickness of the substrate from the first information recording surface 30a to the second information recording surface 30b, and the thickness t3 of the second intermediate layer 34 represents a thickness of the substrate from the second information recording surface 30b to the third information recording surface 30c.

The distance d1 (≈t1) represents a distance from the surface 30z to the first information recording surface 30a, the distance d2 (≈t1+t2) represents a distance from the surface 30z to the second information recording surface 30b, and the distance d3 (≈t1+t2+t3) represents a distance from the surface 30z to the third information recording surface 30c.

Figure 10:
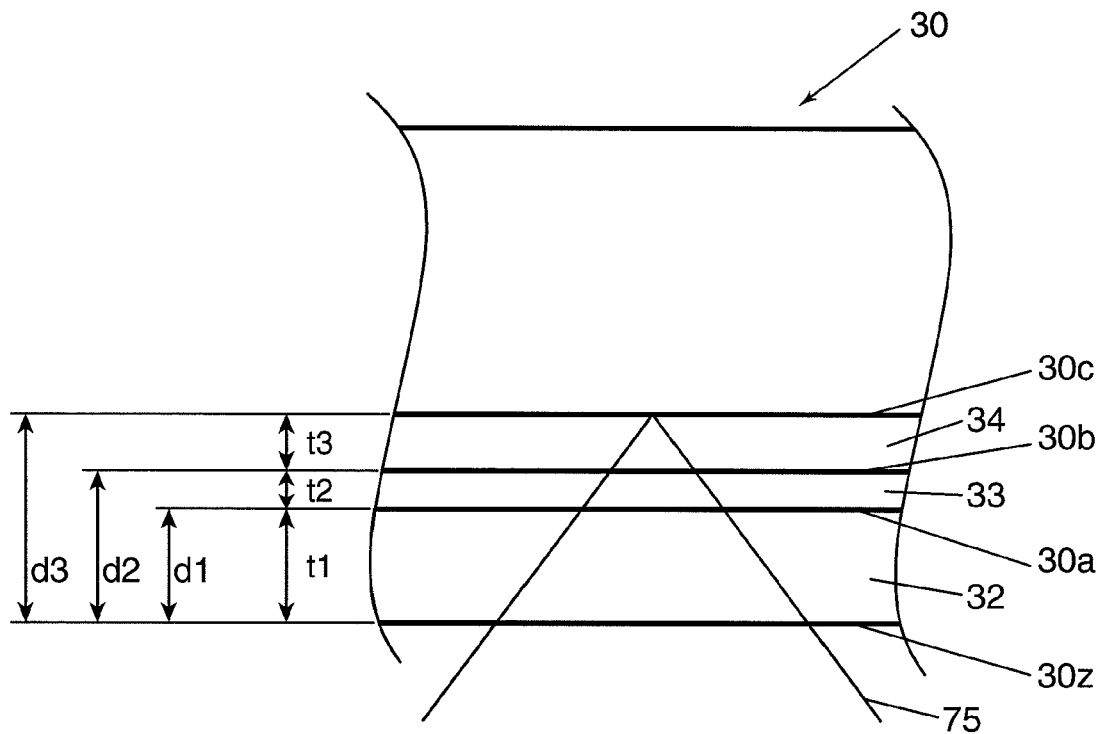
FIG. 10 is a diagram showing reflection light from a third information recording surface, in the case where a beam is collected on the third information recording surface.
Figure 11:
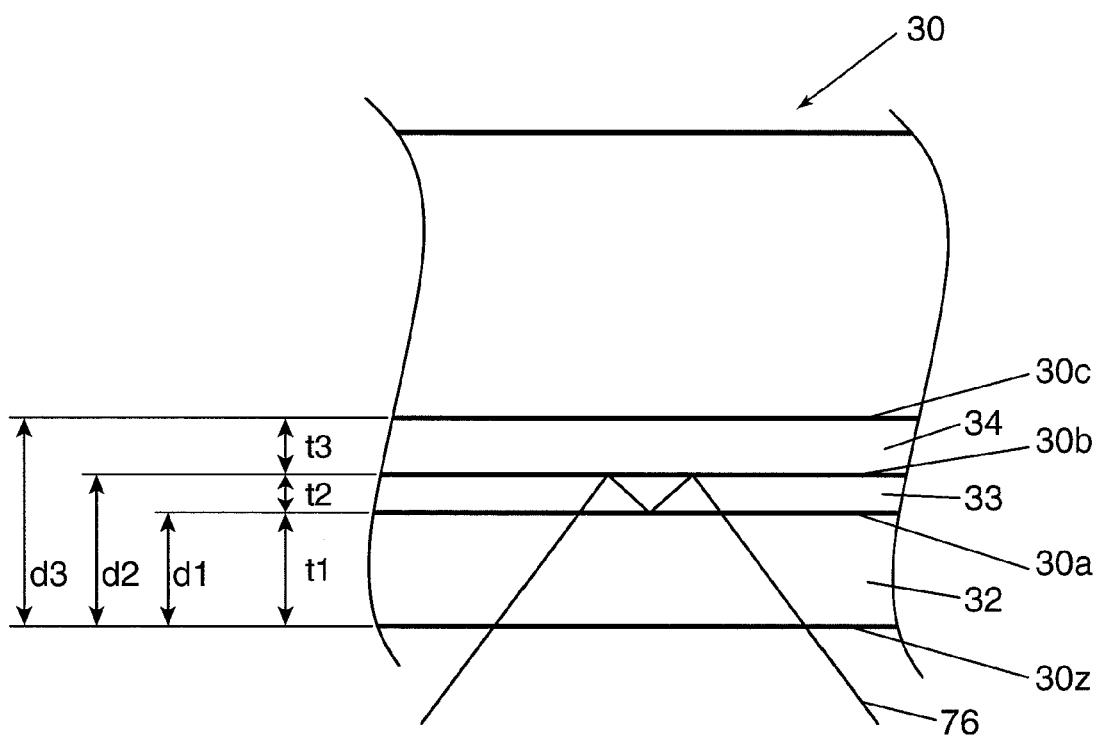
FIG. 11 is a diagram showing reflection light from a second information recording surface and a first information recording surface, in the case where a beam is collected on the third information recording surface.
Figure 12:
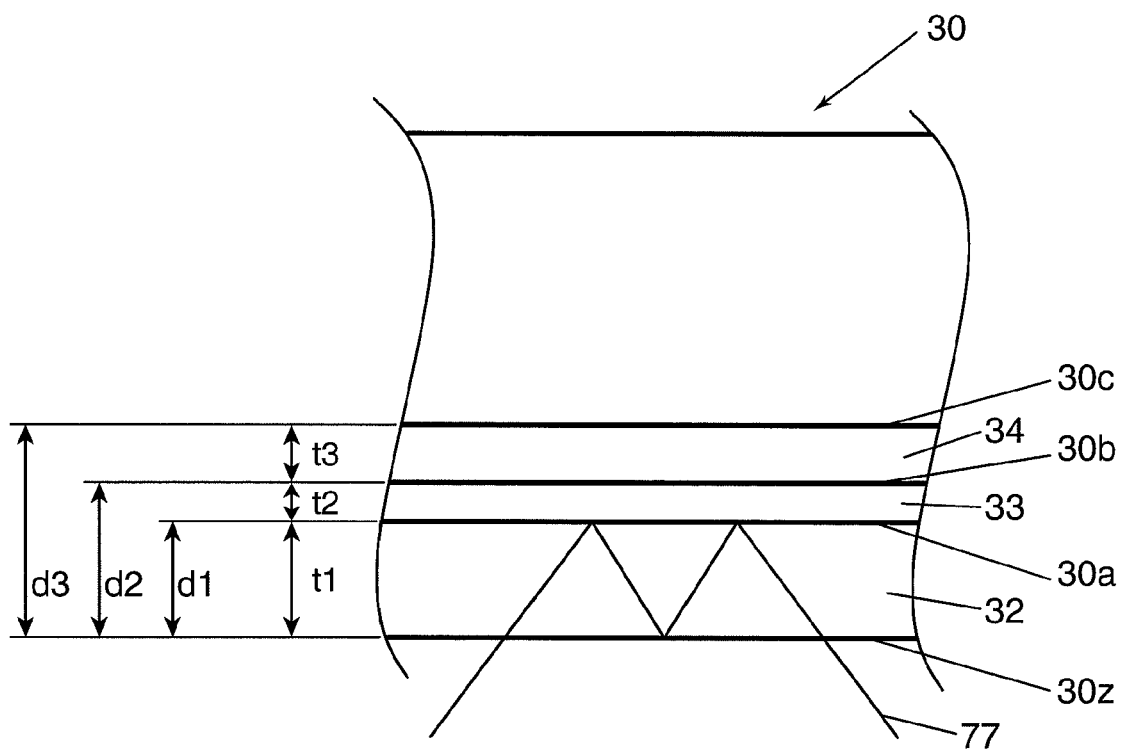
FIG. 12 is a diagram showing reflection light from the first information recording surface and a surface of the optical recording medium, in the case where a beam is collected on the third information recording surface.

Now, problems to be solved in the case where an optical recording medium has three information recording surfaces are described. Coherence by reflection light on multiple surfaces is described referring to FIGS. 10 through 12, as a first problem to be solved. FIG. 10 is a diagram showing reflection light from the third information recording surface 30c, in the case where a beam is collected on the third information recording surface 30c. FIG. 11 is a diagram showing reflection light from the second information recording surface 30b and the first information recording surface 30a, in the case where a beam is collected on the third information recording surface 30c. FIG. 12 is a diagram showing reflection light from the first information recording surface 30a and the surface 30z, in the case where a beam is collected on the third information recording surface 30c.

As shown in FIG. 10, a light flux collected on the third information recording surface 30c for information reproducing or recording is split into the following light beams by semi-translucency of an information recording layer (an information recording surface).

Specifically, a light flux collected on the third information recording surface 30c for information reproducing or recording is split into: a beam 75 to be reflected on the third information recording surface 30c, as shown in FIG. 10; a beam 76 (back focus light with respect to the information recording layer) to be reflected on the second information recording surface 30b, focused and reflected on the backside of the first information recording surface 30a, and reflected on the second information recording surface 30b, as shown in FIG. 11; and a beam 77 (back focus light with respect to the medium surface) reflected on the first information recording surface 30a, focused and reflected on the backside of the surface 30z, and reflected on the first information recording surface 30a, as shown in FIG. 12.

For instance, in the case where the distance (thickness t2) between the second information recording surface 30b and the first information recording surface 30a, and the distance (thickness t3) between the third information recording surface 30c and the second information recording surface 30b are equal to each other, the beam 75 and the beam 76 are incident into a photodetector 320 with an identical optical path length and an identical light flux diameter. Similarly, in the case where the distance (thickness t1) between the first information recording surface 30a and the surface 30z, and the distance (thickness t2+thickness t3) between the third information recording surface 30c and the first information recording surface 30a are equal to each other, the beam 75 and the beam 77 are incident into the photodetector 320 with an identical optical path length and an identical light flux diameter.

The light amounts of the beams 76 and 77 as reflection light from multiple surfaces are small, as compared with the light amount of the beam 75. However, since each of the beams is incident into the photodetector 320 with an identical optical path length and an identical light flux diameter, an influence by coherence between the beams is increased. Further, a light receiving amount by the photodetector 320 is greatly varied depending on a small change in thickness between the information recording layers, which makes it difficult to detect a stable signal.

Since an FS signal is sharply changed when a difference in interlayer thickness becomes 1 μm or less, it is required to set a difference in interlayer thickness of the optical recording medium 30 to 1 μm or more, similarly to the four-layer disc.

As a second problem to be solved, an exceedingly small interlayer distance between adjacent information recording surfaces causes an influence of crosstalk from the adjacent information recording surface. Accordingly, similarly to the four-layer disc, it is necessary to set the interlayer distance to 10 μm or more.

An arrangement of the optical recording medium 30 in accordance with the second embodiment of the invention is described referring to FIG. 9. In the second embodiment, the structure of a three-layer disc (optical recording medium 30) is defined in such a manner as to satisfy the following conditions in order to eliminate an adverse effect of reflection light from the other information recording layer or a disc surface, considering a thickness variation among products.

Condition (1): The thickness t1 of the cover layer 32 is set larger than 50 μm to make the thickness t1 of the cover layer 32 larger than the thickness of a cover layer of a conventional optical disc (t1>50 μm).

Condition (2): The difference between the thickness t1 of the cover layer 32, and the sum (t2+t3) of the thicknesses t2 and t3 of the first intermediate layer 33 and the second intermediate layer 34 is set to 1 μm or more. It is desirable to set the standard value of the distance d2 to 100 μm, which is equal to the standard value of a commercially available BD. By combining the condition (2) with the condition (1) where t1>50 μm, the optical recording medium 30 satisfies a condition: t1−(t2+t3)≧1 μm.

Condition (3): The difference between any two values out of the thicknesses t1, t2, and t3 is set to 1 μm or more in any case.

Condition (4): It is necessary to secure 10 μm or more, as a minimum value of the interlayer thickness (the thickness of the intermediate layer), as described above. In view of this, the thicknesses t2 and t3 are each set to 10 μm or more.

Condition (5): A reduced distance between the information recording surface and the surface 30z increases a tilt margin. In view of this, preferably, the thickness t2 of the first intermediate layer 33 is set to a small value, and the thickness t3 of the second intermediate layer 34 is set to a large value. Based on the above investigation, the thicknesses t2 and t3 satisfy a condition: t3>t2.

Condition (6): The distance d3 from the surface 30z to the third information recording surface 30c farthest from the surface 30z is substantially set to 100 μm. This is advantageous in making the optical recording medium 30 compatible with a BD (Blu-ray Disc) having a largest capacity among the currently and commercially available optical discs, and sufficiently securing a system margin such as a tilt margin.

In the following, let us consider a structure capable of maximizing an allowable production error or variation of a cover layer thickness and an intermediate layer thickness under the conditions (1) through (6).

Let it be assumed that production variations of the cover layer 32, and the first and the second intermediate layers 33 and 34 are the same i.e. ±eμm. In this case, center values of the respective interlayer thicknesses t2 through t3 which satisfy the conditions (1) through (6) are expressed by the following equations (6) and (7), considering an upper limit and a lower limit of each of the interlayer thicknesses t2 through t3.

$$t2=10+e (\mu m) \quad (6)$$

$$t3=(t2+e)+1+e=10+3e+1 \ (\mu m) \quad (7)$$

The lower limit of the thickness t1 should be larger than the sum of the upper limits of the thicknesses t2 and t3 by 1 μm to satisfy the condition (2). Accordingly, t1=22+7e based on the following equation (8).

$$t1-e=(t2+t3+2e)+1 \ (\mu m)=(10+e)+(10+3e+1)+2e+1=22+6e \quad (8)$$

The sum of the thicknesses t1 through t3 is 100 μm, based on the condition (6). Accordingly, the variation "e" is expressed by: e=57/11≈5.2 (μm), based on the following equation (9).

$$t1+t2+t3=(10+e)+(10+3e+1)+(22+7e)=43+11e=100 \ (\mu m) \quad (9)$$

The standard values of the thicknesses t1 through t3 are respectively as follows:
t1=58.3 (μm)
t2=15.2 (μm)
t3=26.5 (μm)

In a commercially available and popularly used two-layer BD, the thickness of an intermediate layer between two information recording layers is about 25 μm. Accordingly, setting the thickness t3 of a three-layer disc to a standard value substantially equal to the thickness of the two-layer BD makes it easy for the three-layer disc to be compatible with a reproducing device and a recording device. As far as a production variation i.e. a tolerance of the thickness of the intermediate layer is set to ±3 μm, it is easy to produce a disc. In view of this, the thickness t3 is set to 25±3 μm. If the thickness t2 of the first intermediate layer 33 is maximized in order to obtain a desirable reproduction signal, while suppressing an interlayer crosstalk, considering the conditions (3) and (5), the thickness t2 is set to 18±3 μm. The thickness t1 of the cover layer 32 is set to 100−(t2+t3)=57 μm.

Accordingly, the distance d1(=t1) is set to 57.0 (μm), the distance d2(=d1+t2) is set to 75.0 (μm), and the distance d3 is set to 100 (μm).

In view of this, the optical recording medium 30 having three information recording surfaces desirably satisfies a condition: 52.0 μm≦t1≦62.0 μm, 15.0 μm≦t2≦21.0 μm, 22.0 μm≦t3≦28.0 μm, 69.0 μm≦d2≦81.0 μm, and 94.0 μm≦d3≦106.0 μm, where d1 is a distance from the surface 30z of the optical recording medium 30 to the first information recording surface 30a closest to the surface 30z of the optical recording medium 30, d2 is a distance from the surface 30z of the optical recording medium 30 to the second information recording surface 30b second closest to the surface 30z of the optical recording medium 30, and d3 is a distance from the surface 30z of the optical recording medium 30 to the third information recording surface 30c farthest from the surface 30z of the optical recording medium 30; and t1(=d1) is a thickness between the surface 30z of the optical recording medium 30 and the first information recording surface 30a, t2(=d2−d1) is a thickness between the first information recording surface 30a and the second information recording surface 30b, and t3(=d3−d2) is a thickness between the second information recording surface 30b and the third information recording surface 30c.

In this example, it is desirable to set the thickness of the cover layer 32 larger than the thicknesses of the first and the second intermediate layers 33 and 34, and set the tolerance thereof to a large value. In view of this, the tolerance of the distance d1 (the thickness t1 of the cover layer 32) is set to ±5 μm. The tolerance of the distance d2, d3 should be set to ±6 μm, considering a degree of deterioration of a focus error signal. The range of the distance d2, d3 is determined, considering the above.

Further, setting the tolerance of the distance d2, d3 to ±5 μm enables to further stably perform a focus pull-in operation with respect to an information recording surface to be recorded or reproduced.

Even if the tolerance of the thickness t2, t3 of the first, the second intermediate layer 33, 34 is increased to 5 μm, focus jumping can be stably performed, and the production margin of the optical recording medium can be increased. In view of this, the optical recording medium 30 desirably satisfies a condition: t3−t2≧1 μm, t2≧10 μm, t1−(t2+t3)≧1 μm, 52.0 μm≦t1≦62.0 μm, 13.0 μm≦t2≦23.0 μm, 20.0 μm≦t3≦30.0 μm, 52.0 μm≦d1≦62.0 μm, 69.0 μm≦d2≦81.0 μm, and 94.0 μm≦d3≦106.0 μm. The above condition is desirable in the aspect of increasing the product yield of the optical recording medium.

The above arrangement enables to prevent image formation on the backside of the surface 30z of the optical recording medium 30, and reduce coherence between reflection light from the information recording surfaces 30a through 30c to thereby improve the quality of a servo signal and a reproduction signal. The above arrangement also enables to set a distance between the surface 30z of the optical recording medium 30, and the first information recording surface 30a closest to the surface 30z of the optical recording medium 30 to a large value to thereby suppress deterioration of a reproduction signal, resulting from a damage or a smear on the surface 30z of the optical recording medium 30.

Further, setting the tolerance of the distance d2, d3 to ±5 μm enables to further stably perform a focus pull-in operation with respect to the first information recording surface 30a closest to the surface 30z.

Producing an optical disc suitable for the conditions without considering the combinations by setting the tolerances of the thicknesses t1 through t3 of the cover layer 32 and the intermediate layers 33 and 34 within a predetermined narrow range, rather than judging whether the combinations of the thicknesses t1 through t3 of the cover layer 32 and the intermediate layers 33 and 34 satisfy the conditions or not, is advantageous in easily setting a target value in production, and facilitating condition setting. As another effect, clarifying the range free of performance drawback as described above enables to discriminate an optical recording medium which has been produced with a value slightly out of the target value, as a non-defective product. Thus, the product yield can be increased to thereby suppress an increase in product cost.

In view of the above, it is desirable to produce the optical recording medium 30 in such a manner that the production tolerance of the optical recording medium 30 is set to ±3 μm, which is two times of the production tolerance of a four-layer optical recording medium; the standard value of the thickness t1 is set in the range of not smaller than 54 μm and not larger than 60 μm; the standard value of the thickness t2 is set in the range of not smaller than 15 μm and not larger than 21 μm; and the standard value of the thickness t3 is set in the range of not smaller than 22 μm and not larger than 28 μm.

Producing the optical recording medium 30 so that the thicknesses t1 through t3 fall in the above respective ranges enables to satisfy substantially almost all the necessary conditions.

However, in the case where all the thicknesses t1 through t3 are large, or conversely all the thicknesses t1 through t3 are small, an error of the distance d3 may be increased to +9 μm (=±3 µm×3), with the result that the distance d3 may be deviated from a condition: 94.0 µm≦d3≦106.0 µm. In view of this, it is most desirable to set the thickness t1 in the range of not smaller than 55 µm and not larger than 59 µm, the thickness t2 in the range of not smaller than 16 µm and not larger than 20 µm, and the thickness t3 in the range of not smaller than 23 µm and not larger than 27 µm. In other words, it is most desirable to produce the optical recording medium 30 in such a manner that the thickness t1 is set to 57+2 µm, the thickness t2 is set to 18±2 µm, and the thickness t3 is set to 25±2 µm.

A method for producing the optical recording medium 30 having three information recording surfaces has a step of forming, on a substrate, the cover layer (light transmissive layer) 32, the first information recording surface 30a, the first intermediate layer 33, the second information recording surface 30b, the second intermediate layer 34, and the third information recording surface 30c. The first through the third information recording surfaces 30a through 30c, the first and the second intermediate layers 33 and 34, and the cover layer 32 are formed in such a manner that the thickness t1 of the cover layer 32, and the thicknesses t2 and t3 of the first and the second intermediate layers 33 and 34 satisfy a condition: 55.0 µm≦t1≦59.0 µm, 16.0 µm≦t2≦22.0 µm, and 23.0 µm≦t3≦27.0 µm.

The optical recording medium 30 produced by the above production method satisfies a condition: t2–t3≧1 µm and t1–(t2+t3)≧1 µm. The optical recording medium 30 produced by the above production method also satisfies a condition: 52.0 µm≦t1≦62.0 µm, 13.0 µm≦t2≦23.0 µm, 20.0 µm≦t3≦30.0 µm, 69.0 µm≦d2≦81.0 µm and 94.0 µm≦d3≦106.0 µm.

Further, the first through the third information recording surfaces 30a through 30c, the first and the second intermediate layers 33 and 34, and the cover layer 32 are formed in such a manner that the standard value of the thickness t1 is set to 57.0 µm, the standard value of the thickness t2 is set to 18.0 µm, and the standard value of the thickness t3 is set to 25.0 µm; and that the tolerances of the thickness t1 of the cover layer 32 and the thicknesses t2 and t3 of the first and the second intermediate layers 33 and 34 are each set to 2.0 µm or less.

(Third Embodiment)

In the third embodiment, another embodiment of an optical recording medium having three information surfaces is described. If allowing all the thicknesses of intermediate layers to fall in a range capable of stably performing focus jumping is prioritized, while reducing the thickness t2, an optical recording medium can be more easily produced at a reduced cost. Based on the investigation in the second embodiment, the thickness t3 can be set in the range of not smaller than 20 µm and not larger than 30 µm by setting the standard value of the thickness t3 to 25 µm, and setting the tolerance of the thickness t3 to ±5 µm.

Further, the upper limit of the thickness t2 can be set to 19 µm by setting the thickness t2 to a value smaller than the minimum thickness of the thickness t3 by 1 µm or more. Since the thickness t2 is smaller than the thickness t3, the tolerance of the thickness t2 can be reduced, as compared with the tolerance of the thickness t3. In view of this, the thickness t2 is set in the range of not smaller than 11 µm and not larger than 19 µm by setting the tolerance of the thickness t2 to ±4 µm. The standard value of the thickness t2 may be set to 15 µm, as an intermediate value of the allowable range of the thickness t2.

The standard value of the thickness t1 is set to 60 µm, based on an equation: t1=100 µm−t2−t3. The thickness t1 is set in the range of not smaller than 55 µm and not larger than 65 µm by setting the tolerance of the thickness t1 to ±5 µm.

In view of the above setting conditions on the respective intermediate layers, the optical recording medium 30 having three information recording surfaces desirably satisfies a condition: 55.0 µm≦t1≦65.0 µm, 11.0 µm≦t2≦19.0 µm, 20.0 µm≦t3≦30.0 µm, 69.0 µm≦d2≦81.0 µm and 94.0 µm≦d3≦106.0 µm, where d1 is a distance from the surface 30z of the optical recording medium 30 to the first information recording surface 30a closest to the surface 30z of the optical recording medium 30, d2 is a distance from the surface 30z of the optical recording medium 30 to the second information recording surface 30b second closest to the surface 30z of the optical recording medium 30, and d3 is a distance from the surface 30z of the optical recording medium 30 to the third information recording surface 30c farthest from the surface 30z of the optical recording medium 30; and t1(=d1) is a thickness between the surface 30z of the optical recording medium 30 and the first information recording surface 30a, t2(=d2−d1) is a thickness between the first information recording surface 30a and the second information recording surface 30b, and t3(=d3−d2) is a thickness between the second information recording surface 30b and the third information recording surface 30c.

Further, in view of easily setting a spherical aberration in performing a focus pull-in operation, setting the tolerance of the distance d2, d3 to ±5 µm enables to further stably perform a focus pull-in operation with respect to the first information recording surface 30a closest to the surface 30z. In view of this, it is desirable to set the distance d2 in the range of not smaller than 70.0 µm and not larger than 80.0 µm, and the distance d3 in the range of not smaller than 95.0 µm and not larger than 105. µm.

As described above, the optical recording medium having four or three information recording surfaces produced by the aforementioned combinations enables to suppress an influence of reflection light on a signal surface of a targeted information recording layer to be read. This enables to provide a large-capacity optical recording medium capable of obtaining a stable servo signal and reproduction signal.

The aforementioned embodiments mainly include the features having the following arrangements.

An optical recording medium according to an aspect of the invention is an optical recording medium having four information recording surfaces. The optical recording medium satisfies: t3–t4≧1 µm, t4–t2≧1 µm, t2≧10 µm, and t1–(t2+t3+t4)≧1 µm, where t1 is a thickness between a surface of the optical recording medium, and the first information recording surface closest to the surface of the optical recording medium, t2 is a thickness between the first optical recording surface, and the second information recording surface second closest to the surface of the optical recording medium, t3 is a thickness between the second optical recording surface, and the third information recording surface third closest to the surface of the optical recording medium, and t4 is a thickness between the third optical recording surface, and the fourth information recording surface farthest from the surface of the optical recording medium.

According to the above arrangement, the optical recording medium having four information recording surfaces satisfies the condition: t3–t4≧1 µm, t4–t2≧1 µm, t2≧10 µm, and t1–(t2+t3+t4)≧1 µm. Accordingly, the above arrangement enables to prevent image formation on the backside of the surface of the optical recording medium, and reduce coherence between reflection light from the information recording surfaces to thereby improve the quality of a servo signal and a reproduction signal. The above arrangement also enables to set a distance between the surface of the optical recording medium, and the information recording surface closest to the surface of the optical recording medium to a large value to thereby suppress deterioration of a reproduction signal, resulting from a damage or a smear on the surface of the optical recording medium.

In the optical recording medium, preferably, the optical recording medium may satisfy: 53.5 µm−E1≦d1≦53.5 µm+E1, 65.0 µm−E2≦d2≦65.0 µm+E2, 84.5 µm−E3≦d3≦84.5 µm+E3, and 100.0 µm−E4≦d4≦100.0 µm+E4, where d1 is a distance from the surface of the optical recording medium to the first information recording surface, d2 is a distance from the surface of the optical recording medium to the second information recording surface, d3 is a distance from the surface of the optical recording medium to the third information recording surface, d4 is a distance from the surface of the optical recording medium to the fourth information recording surface, and E1, E2, E3, and E4 are respectively tolerances of the distances d1, d2, d3, and d4, the tolerances E1, E2, E3, and E4 each being set to 6 µm or less.

According to the above arrangement, the optical recording medium satisfies the condition: 53.5 µm−E1≦d1≦53.5 µm+E1, 65.0 µm−E2≦d2≦65.0 µm+E2, 84.5 µm−E3≦d3≦84.5 µm+E3, and 100.0 µm−E4≦d4≦100.0 µm+E4, and the tolerances E1, E2, E3, and E4 are each set to 6 µm or less.

Accordingly, setting the tolerances E1, E2, E3, and E4 each to 6 µm or less enables to suppress deterioration of a focus error signal to thereby stably perform focus control.

In the optical recording medium, preferably, the tolerance E1 may be set to 3 µm. The tolerance E1 is determined only by an error of the thickness t1, and is not affected by an influence of the thicknesses of the other intermediate layers. Accordingly, setting the tolerance E1 to 3 µm enables to further stably perform a focus pull-in operation with respect to the first information recording surface closest to the surface of the optical recording medium.

In the optical recording medium, preferably, the tolerance E2 may be set to 4.5 µm. According to this arrangement, setting the tolerance E2 to 4.5 µm enables to further stably perform a focus pull-in operation with respect to the second information recording surface second closest to the surface of the optical recording medium.

In the optical recording medium, preferably, the thickness t3 may be set to 25.5 µm or less.

Stable focus control cannot be resumed unless a spherical aberration amount is adjusted with respect to the third information recording surface as a focus jumping destination, in focus jumping from the second information recording surface to the third information recording surface, because the amplitude and the sensitivity of a focus error signal may be deteriorated. In view of this, it is desirable to suppress the tolerance of the thickness t3 to 6 µm. Setting the thickness t3 to 25.5 µm or less enables to suppress deterioration of a focus error signal to thereby stably perform focus control.

In the optical recording medium, preferably, the thickness t3 may be set to 24.5 µm or less. According to this arrangement, setting the thickness t3 to 24.5 µm or less enables to further stably perform focus jumping.

In the optical recording medium, preferably, the thickness t2 may be set in a range of not smaller than 10.0 µm and not larger than 16.5 µm, the thickness t3 may be set in a range of not smaller than 14.5 µm and not larger than 24.5 µm, and the thickness t4 may be set in a range of not smaller than 11.0 µm and not larger than 20.5 µm.

According to the above arrangement, suppressing the tolerances of the thicknesses t2, t3, and t4 each to 5 µm, in other words, setting the thickness t2 in the range of not smaller than 10.0 µm and not larger than 16.5 µm, the thickness t3 in the range of not smaller than 14.5 µm and not larger than 24.5 µm, and the thickness t4 in the range of not smaller than 11.0 µm and not larger than 20.5 µm enables to further stably perform focus jumping.

In the optical recording medium, preferably, the distance d1 may be set larger than 50 µm. According to this arrangement, setting the distance d1 larger than 50 µm enables to set the thickness from the surface of the optical recording medium to the information recording surface closest to the surface of the optical recording medium larger than the thickness of a cover layer of a conventional optical recording medium.

A method for producing an optical recording medium according to another aspect of the invention is a method for producing an optical recording medium having four information recording surfaces. The method includes a step of forming, on a substrate, a light transmissive layer, a first information recording surface, a first intermediate layer, a second information recording surface, a second intermediate layer, a third information recording surface, a third intermediate layer, and a fourth information recording surface, wherein the first through the fourth information recording surfaces, the first through the third intermediate layers, and the light transmissive layer are formed in such a manner that a thickness of the light transmissive layer and thicknesses of the first through the third intermediate layers satisfy: 52.0 µm≦t1≦55.0 µm, 10.0 µm≦t2≦13.0 µm, 18.0 µm≦t3≦21.0 µm, and 14.0 µm≦t4≦17.0 µm, where t1 is the thickness of the light transmissive layer, t2 is the thickness of the first intermediate layer, t3 is the thickness of the second intermediate layer, and t4 is the thickness of the third intermediate layer.

According to this arrangement, the light transmissive layer, the first information recording surface, the first intermediate layer, the second information recording surface, the second intermediate layer, the third information recording surface, the third intermediate layer, and the fourth information recording surface are formed on the substrate. Further, the first through the fourth information recording surfaces, the first through the third intermediate layers, and the light transmissive layer are formed in such a manner that the thickness of the light transmissive layer and the thicknesses of the first through the third intermediate layers satisfy: 52.0 µm≦t1≦55.0 µm, 10.0 µm=t2≦13.0 µm, 18.0 µm≦t3≦21.0 µm, and 14.0 µm≦t4≦17.0 µm.

The above arrangement enables to prevent image formation on the backside of the surface of the optical recording medium, and reduce coherence between reflection light from the information recording surfaces, and also enables to set a distance between the surface of the optical recording medium, and the information recording surface closest to the surface of the optical recording medium to a large value.

In the method for producing an optical recording medium, preferably, the optical recording medium produced by the method may satisfy: t3−t4≧1 µm, t4−t2≧1 µm, t2≧10 µm, and t1−(t2+t3+t4)≧1 µm, where d2 is a distance from a surface of the optical recording medium to the second information recording surface, d3 is a distance from the surface of the optical recording medium to the third information recording surface, and d4 is a distance from the surface of the optical recording medium to the fourth information recording surface.

According to the above arrangement, the optical recording medium is produced in such a manner as to satisfy the condition: t3−t4≧1 µm, t4−t2≧1 µm, t2≧10 µm, and t1−(t2+t3+ t4)≧1 μm. The above arrangement enables to prevent image formation on the backside of the surface of the optical recording medium, and reduce coherence between reflection light from the information recording surfaces to thereby improve the quality of a servo signal and a reproduction signal. The above arrangement also enables to set a distance between the surface of the optical recording medium, and the information recording surface closest to the surface of the optical recording medium to a large value to thereby suppress deterioration of a reproduction signal, resulting from a damage or a smear on the surface of the optical recording medium.

In the method for producing an optical recording medium, preferably, the optical recording medium produced by the method may satisfy: 60.5 μm≦d2≦69.5 μm, 78.5 μm≦d3≦90.5 μm, 94.0 μm≦d4≦106.0 μm, 50.5 μm≦t1≦56.5 μm, 10.0 μm≦t2≦16.5 μm, 14.5 μm≦t3c≦24.5 μm, and 11.0 μm≦t4≦20.5 μm.

According to the above arrangement, the optical recording medium is produced in such a manner as to satisfy the condition: 60.5 μm≦d2≦69.5 μm, 78.5 μm≦d3≦90.5 μm, 94.0 μm≦d4≦106.0 μm, 50.5 μm≦t1≦6.5 μm, 10.0 μm≦t2≦16.5 μm, 14.5 μm≦t3≦24.5 μm, and 11.0 μm≦t4≦20.5 μm. Accordingly, suppressing the tolerances of the thicknesses t2, t3, and t4 each to 5 μm enables to further stably perform focus jumping.

In the method for producing an optical recording medium, preferably, the first through the fourth information recording surfaces, the first through the third intermediate layers, and the light transmissive layer may be so formed as to satisfy: a standard value of the thickness t1 is set to 53.5 μm, a standard value of the thickness t2 is set to 11.5 μm, a standard value of the thickness t3 is set to 19.5 μm, a standard value of the thickness t4 is set to 15.5 μm, and tolerances of the thickness of the light transmissive layer and the thicknesses of the first through the third intermediate layers are each set to 1.5 μm or less.

According to the above arrangement, the first through the fourth information recording surfaces, the first through the third intermediate layers, and the light transmissive layer are so formed as to satisfy the condition: the standard value of the thickness t1 is set to 53.5 μm, the standard value of the thickness t2 is set to 11.5 μm, the standard value of the thickness t3 is set to 19.5 μm, the standard value of the thickness t4 is set to 15.5 μm, and the tolerances of the thickness of the light transmissive layer and the thicknesses of the first through the third intermediate layers are each set to 1.5 μm or less.

The above arrangement enables to prevent image formation on the backside of the surface of the optical recording medium, and reduce coherence between reflection light from the information recording surfaces to thereby improve the quality of a servo signal and a reproduction signal. The above arrangement also enables to set a distance between the surface of the optical recording medium, and the information recording surface closest to the surface of the optical recording medium to a large value to thereby suppress deterioration of a reproduction signal, resulting from a damage or a smear on the surface of the optical recording medium.

An optical recording medium according to another aspect of the invention is an optical recording medium having three information recording surfaces. The optical recording medium satisfies: t3−t2≧1 μm, t2≧10 μm, and t1−(t2+t3)≧1 μm, where t1 is a thickness between a surface of the optical recording medium, and the first information recording surface closest to the surface of the optical recording medium, t2 is a thickness between the first optical recording surface, and the second information recording surface second closest to the surface of the optical recording medium, and t3 is a thickness between the second optical recording surface, and the third information recording surface farthest from the surface of the optical recording medium.

According to the above arrangement, the optical recording medium having three information recording surfaces satisfies the condition: t3−t2≧1 μm, t2≧10 μm, and t1−(t2+t3)≧1 μm. The above arrangement enables to prevent image formation on the backside of the surface of the optical recording medium, and reduce coherence between reflection light from the information recording surfaces to thereby improve the quality of a servo signal and a reproduction signal. The above arrangement also enables to set a distance between the surface of the optical recording medium, and the information recording surface closest to the surface of the optical recording medium to a large value to thereby suppress deterioration of a reproduction signal, resulting from a damage or a smear on the surface of the optical recording medium.

In the optical recording medium, preferably, the optical recording medium may satisfy: 52.0 μm≦t1≦62.0 μm, 13.0 μm≦t2≦23.0 μm, 20.0 μm≦t3≦30.0 μm, 69.0 μm≦d2≦81.0 μm, and 94.0 μm≦d3≦106.0 μm, where d2 is a distance from the surface of the optical recording medium to the second information recording surface, and d3 is a distance from the surface of the optical recording medium to the third information recording surface.

According to the above arrangement, the optical recording medium satisfies the condition: 52.0 μm≦t1≦62.0 μm, 13.0 μm≦t2≦23.0 μm, 20.0 μm≦t3≦30.0 μm, 69.0 μm≦d2≦81.0 μm, and 94.0 μm≦d3≦106.0 μm. Accordingly, suppressing the tolerances of the thicknesses t2 and t3 each to 5 μm enables to further stably perform focus jumping.

A method for producing an optical recording medium according to another aspect of the invention is a method for producing an optical recording medium having three information recording surfaces. The method includes a step of forming, on a substrate, a light transmissive layer, a first information recording surface, a first intermediate layer, a second information recording surface, a second intermediate layer, and a third information recording surface, wherein the first through the third information recording surfaces, the first and the second intermediate layers, and the light transmissive layer are formed in such a manner that a thickness of the light transmissive layer and thicknesses of the first and the second intermediate layers satisfy: 55.0 μm≦t1≦59.0 μm, 16.0 μm≦t2≦20.0 μm, and 23.0 μm≦t3≦27.0 μm, where t1 is the thickness of the light transmissive layer, t2 is the thickness of the first intermediate layer, and t3 is the thickness of the second intermediate layer.

According to the above arrangement, the light transmissive layer, the first information recording surface, the first intermediate layer, the second information recording surface, the second intermediate layer, and the third information recording surface are formed on the substrate. Further, the first through the third information recording surfaces, the first and the third intermediate layers, and the light transmissive layer are formed in such a manner that the thickness of the light transmissive layer and the thicknesses of the first and the second intermediate layers satisfy the condition: 55.0 μm≦t1≦59.0 μm, 16.0 μm≦t2≦20.0 μm, and 23.0 μm≦t3≦27.0 μm.

The above arrangement enables to prevent image formation on the backside of the surface of the optical recording medium, and reduce coherence between reflection light from the information recording surfaces to thereby improve the quality of a servo signal and a reproduction signal. The above arrangement also enables to set a distance between the surface of the optical recording medium, and the information recording surface closest to the surface of the optical recording medium to a large value to thereby suppress deterioration of a reproduction signal, resulting from a damage or a smear on the surface of the optical recording medium.

In the optical recording medium, preferably, the optical recording medium produced by the method may satisfy: $t2-t3 \geq 1$ μm, and $t1-(t2+t3) \geq 1$ μm.

According to the above arrangement, the optical recording medium is produced in such a manner as to satisfy the condition: $t2-t3 \geq 1$ μm, and $t1-(t2+t3) \geq 1$ μm. This arrangement enables to prevent image formation on the backside of the surface of the optical recording medium, and reduce coherence between reflection light from the information recording surfaces, and also enables to set a distance between the surface of the optical recording medium, and the information recording surface closest to the surface of the optical recording medium to a large value.

In the optical recording medium, preferably, the optical recording medium produced by the method may satisfy: $52.0$ μm $\leq t1 \leq 62.0$ μm, $13.0$ μm $\leq t2 \leq 23.0$ μm, $20.0$ μm $\leq t3 \leq 30.0$ μm, $69.0$ μm $\leq d2 \leq 81.0$ μm, and $94.0$ μm $\leq d3 \leq 106.0$ μm, where d2 is a distance from a surface of the optical recording medium to the second information recording surface, and d3 is a distance from the surface of the optical recording medium to the third information recording surface.

According to the above arrangement, the optical recording medium is produced in such a manner as to satisfy the condition: $52.0$ μm $\leq t1 \leq 62.0$ μm, $13.0$ μm $\leq t2 \leq 23.0$ μm, $20.0$ μm $\leq t3 \leq 30.0$ μm, $69.0$ μm $\leq d2 \leq 81.0$ μm, and $94.0$ μm $\leq d3 \leq 106.0$ μm. Accordingly, suppressing the tolerances of the thicknesses t2 and t3 each to 5 μm enables to further stably perform focus jumping.

In the optical recording medium, preferably, the first through the third information recording surfaces, the first and the second intermediate layers, and the light transmissive layer may be so formed as to satisfy: a standard value of the thickness t1 is set to 57.0 μm, a standard value of the thickness t2 is set to 18.0 μm, a standard value of the thickness t3 is set to 25.0 μm, and tolerances of the thickness of the light transmissive layer and the thicknesses of the first and the second intermediate layers are each set to 2.0 μm or less.

According to the above arrangement, the first through the third information recording surfaces, the first and the second intermediate layers, and the light transmissive layer are so formed as to satisfy the condition: the standard value of the thickness t1 is set to 57.0 μm, the standard value of the thickness t2 is set to 18.0 μm, the standard value of the thickness t3 is set to 25.0 μm, and the tolerances of the thickness of the light transmissive layer and the thicknesses of the first and the second intermediate layers are each set to 2.0 μm or less.

The above arrangement enables to prevent image formation on the backside of the surface of the optical recording medium, and reduce coherence between reflection light from the information recording surfaces to thereby improve the quality of a servo signal and a reproduction signal. The above arrangement also enables to set a distance between the surface of the optical recording medium, and the information recording surface closest to the surface of the optical recording medium to a large value to thereby suppress deterioration of a reproduction signal, resulting from a damage or a smear on the surface of the optical recording medium.

The inventive optical recording medium and the inventive method for producing an optical recording medium enable to maximally suppress an influence of reflection light from the other information recording surface(s) at the time of recording or reproducing on or from a targeted information recording surface to thereby reduce the influence of reflection light on a servo signal and a reproduction signal. Thus, the invention enables to provide a large-capacity optical recording medium capable of obtaining a reproduction signal of a good quality and easily securing compatibility with an existing disc.

This application is based on U.S. Provisional Application Ser. No. 61/106,012 filed on Oct. 16, 2008, the contents of which are hereby incorporated by reference.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

What is claimed is:

1. An optical recording medium comprising four information recording surfaces, the optical recording medium satisfying:

$$t3-t4 \geq 1 \text{ μm},$$

$$t4-t2 \geq 1 \text{ μm},$$

$$t2 \geq 10 \text{ μm, and}$$

$$t1-(t2+t3+t4) \geq 1 \text{ μm, where}$$

t1 is a thickness between a surface of the optical recording medium, and the first information recording surface closest to the surface of the optical recording medium, t2 is a thickness between the first optical recording surface, and the second information recording surface second closest to the surface of the optical recording medium, t3 is a thickness between the second optical recording surface, and the third information recording surface third closest to the surface of the optical recording medium, and t4 is a thickness between the third optical recording surface, and the fourth information recording surface farthest from the surface of the optical recording medium.

2. The optical recording medium according to claim 1, wherein the optical recording medium satisfies:

$$53.5 \text{ μm}-E1 \leq d1 \leq 53.5 \text{ μm}+E1,$$

$$65.0 \text{ μm}-E2 \leq d2 \leq 65.0 \text{ μm}+E2,$$

$$84.5 \text{ μm}-E3 \leq d3 \leq 84.5 \text{ μm}+E3, \text{ and}$$

$$100.0 \text{ μm}-E4 \leq d4 \leq 100.0 \text{ μm}+E4, \text{ where}$$

d1 is a distance from the surface of the optical recording medium to the first information recording surface, d2 is a distance from the surface of the optical recording medium to the second information recording surface, d3 is a distance from the surface of the optical recording medium to the third information recording surface, d4 is a distance from the surface of the optical recording medium to the fourth information recording surface, and E1, E2, E3, and E4 are respectively tolerances of the distances d1, d2, d3, and d4, the tolerances E1, E2, E3, and E4 each being set to 6 μm or less.

3. The optical recording medium according to claim 2, wherein the tolerance E1 is set to 3 μm.

4. The optical recording medium according to claim 2, wherein
the tolerance E2 is set to 4.5 μm.

5. The optical recording medium according to claim 1, wherein
the thickness t3 is set to 25.5 μm or less.

6. The optical recording medium according to claim 1, wherein
the thickness t3 is set to 24.5 μm or less.

7. The optical recording medium according to claim 1, wherein
the thickness t2 is set in a range of not smaller than 10.0 μm and not larger than 16.5 μm,
the thickness t3 is set in a range of not smaller than 14.5 μm and not larger than 24.5 μm, and
the thickness t4 is set in a range of not smaller than 11.0 μm and not larger than 20.5 μm.

8. The optical recording medium according to claim 1, wherein
the distance d1 is set larger than 50 μm.

9. A method for producing an optical recording medium having four information recording surfaces, the method comprising:
a step of forming, on a substrate, a light transmissive layer, a first information recording surface, a first intermediate layer, a second information recording surface, a second intermediate layer, a third information recording surface, a third intermediate layer, and a fourth information recording surface, wherein
the first through the fourth information recording surfaces, the first through the third intermediate layers, and the light transmissive layer are formed in such a manner that a thickness of the light transmissive layer and thicknesses of the first through the third intermediate layers satisfy:

$52.0 \ \mu m \leq t1 \leq 55.0 \ \mu m$, $10.0 \ \mu m \leq t2 \leq 13.0 \ \mu m$, $18.0 \ \mu m \leq t3 \leq 21.0 \ \mu m$, and $14.0 \ \mu m \leq t4 \leq 17.0 \ \mu m$, where t1 is the thickness of the light transmissive layer,
t2 is the thickness of the first intermediate layer,
t3 is the thickness of the second intermediate layer, and
t4 is the thickness of the third intermediate layer.

10. The method for producing an optical recording medium according to claim 9, wherein
the optical recording medium produced by the method satisfies:

$t3-t4 \geq 1 \ \mu m$, $t4-t2 \geq 1 \ \mu m$, $t2 \geq 10 \ \mu m$, and $t1-(t2+t3+t4) \geq 1 \ \mu m$, where d2 is a distance from a surface of the optical recording medium to the second information recording surface,
d3 is a distance from the surface of the optical recording medium to the third information recording surface, and
d4 is a distance from the surface of the optical recording medium to the fourth information recording surface.

11. The method for producing an optical recording medium according to claim 10, wherein
the optical recording medium produced by the method satisfies:

$60.5 \ \mu m \leq d2 \leq 69.5 \ \mu m$, $78.5 \ \mu m \leq d3 \leq 90.5 \ \mu m$, $94.0 \ \mu m \leq d4 \leq 106.0 \ \mu m$, $50.5 \ \mu m \leq t1 \leq 56.5 \ \mu m$, $10.0 \ \mu m \leq t2 \leq 16.5 \ \mu m$, $14.5 \ \mu m \leq t3 \leq 24.5 \ \mu m$, and $11.0 \ \mu m \leq t4 \leq 20.5 \ \mu m$.

12. The method for producing an optical recording medium according to claim 9, wherein
the first through the fourth information recording surfaces, the first through the third intermediate layers, and the light transmissive layer are so formed as to satisfy:
a standard value of the thickness t1 is set to 53.5 μm,
a standard value of the thickness t2 is set to 11.5 μm,
a standard value of the thickness t3 is set to 19.5 μm,
a standard value of the thickness t4 is set to 15.5 μm, and
tolerances of the thickness of the light transmissive layer and the thicknesses of the first through the third intermediate layers are each set to 1.5 μm or less.

13. An optical recording medium comprising three information recording surfaces, the optical recording medium satisfying:

$t3-t2 \geq 1 \ \mu m$, $t2 \geq 10 \ \mu m$, and $t1-(t2+t3) \geq 1 \ \mu m$, where t1 is a thickness between a surface of the optical recording medium, and the first information recording surface closest to the surface of the optical recording medium,
t2 is a thickness between the first optical recording surface, and the second information recording surface second closest to the surface of the optical recording medium, and
t3 is a thickness between the second optical recording surface, and the third information recording surface farthest from the surface of the optical recording medium.

14. The optical recording medium according to claim 13, wherein
the optical recording medium satisfies:

$52.0 \ \mu m \leq t1 \leq 62.0 \ \mu m$, $13.0 \ \mu m \leq t2 \leq 23.0 \ \mu m$, $20.0 \ \mu m \leq t3 \leq 30.0 \ \mu m$, $69.0 \ \mu m \leq d2 \leq 81.0 \ \mu m$, and $94.0 \ \mu m \leq d3 \leq 106.0 \ \mu m$, where d2 is a distance from the surface of the optical recording medium to the second information recording surface, and
d3 is a distance from the surface of the optical recording medium to the third information recording surface.

15. A method for producing an optical recording medium having three information recording surfaces, the method comprising:
a step of forming, on a substrate, a light transmissive layer, a first information recording surface, a first intermediate layer, a second information recording surface, a second intermediate layer, and a third information recording surface, wherein the first through the third information recording surfaces, the first and the second intermediate layers, and the light transmissive layer are formed in such a manner that a thickness of the light transmissive layer and thicknesses of the first and the second intermediate layers satisfy:

55.0 μm ≤ t1 ≤ 59.0 μm, 16.0 μm ≤ t2 ≤ 20.0 μm, and 23.0 μm ≤ t3 ≤ 27.0 μm, where t1 is the thickness of the light transmissive layer,
t2 is the thickness of the first intermediate layer, and
t3 is the thickness of the second intermediate layer.

16. The method for producing an optical recording medium according to claim 15, wherein
the optical recording medium produced by the method satisfies:

$t2 - t3 \geq 1$ μm, and $t1 - (t2 + t3) \geq 1$ μm.

17. The method for producing an optical recording medium according to claim 16, wherein
the optical recording medium produced by the method satisfies:

52.0 μm ≤ t1 ≤ 62.0 μm, 13.0 μm ≤ t2 ≤ 23.0 μm, 20.0 μm ≤ t3 ≤ 30.0 μm, 69.0 μm ≤ d2 ≤ 81.0 μm, and 94.0 μm ≤ d3 ≤ 106.0 μm, where d2 is a distance from a surface of the optical recording medium to the second information recording surface, and
d3 is a distance from the surface of the optical recording medium to the third information recording surface.

18. The method for producing an optical recording medium according to claim 15, wherein
the first through the third information recording surfaces, the first and the second intermediate layers, and the light transmissive layer are so formed as to satisfy:
a standard value of the thickness t1 is set to 57.0 μm,
a standard value of the thickness t2 is set to 18.0 μm,
a standard value of the thickness t3 is set to 25.0 μm, and
tolerances of the thickness of the light transmissive layer and the thicknesses of the first and the second intermediate layers are each set to 2.0 μm or less.

* * * * *